US006934858B2

(12) United States Patent
Woodhill

(10) Patent No.: US 6,934,858 B2
(45) Date of Patent: Aug. 23, 2005

(54) SYSTEM AND METHOD OF USING THE PUBLIC SWITCHED TELEPHONE NETWORK IN PROVIDING AUTHENTICATION OR AUTHORIZATION FOR ONLINE TRANSACTIONS

(75) Inventor: James R. Woodhill, Houston, TX (US)

(73) Assignee: Authentify, Inc., Chicago, IL (US)

( * ) Notice: Subject to any disclaimer, the term of this patent is extended or adjusted under 35 U.S.C. 154(b) by 914 days.

(21) Appl. No.: 09/737,254

(22) Filed: Dec. 13, 2000

(65) Prior Publication Data

US 2002/0004831 A1 Jan. 10, 2002

Related U.S. Application Data

(60) Provisional application No. 60/170,808, filed on Dec. 15, 1999.

(51) Int. Cl.[7] .................................................. H04L 9/32
(52) U.S. Cl. ...................................................... 713/201
(58) Field of Search ................................ 713/200–202, 713/186; 379/88.01, 88.02; 340/5.84

(56) References Cited

U.S. PATENT DOCUMENTS 5,995,606 A * 11/1999 Civanlar et al. ....... 379/207.13
6,012,144 A * 1/2000 Pickett ....................... 713/201
6,044,471 A 3/2000 Colvin
6,088,683 A 7/2000 Jalili
6,167,518 A 12/2000 Padgett et al. .............. 713/186
6,175,626 B1 1/2001 Aucsmith et al. ............. 380/30
6,574,599 B1 * 6/2003 Lim et al. ................... 704/270

OTHER PUBLICATIONS

Copy of the International Search Report mailed Mar. 23, 2001 for the PCT counterpart application of the above–identified application.

* cited by examiner

*Primary Examiner*—Matthew Smithers
(74) *Attorney, Agent, or Firm*—Welsh & Katz, Ltd.

(57) ABSTRACT

An authentication or authorization system to facilitate electronic transactions uses simultaneous or substantially simultaneous communications on two different networks to verify a user's identity. When a user logs onto a site, via the internet, a telephone number, either pre-stored or obtained in real time from the visitor, where the visitor can be called essentially immediately is used to set up, via the switched telephone network another communication link. Where the user has multiple communication links available, the telephone call is automatically placed via the authentication or authorization software simultaneously while the user is on-line. In the event that the user has only a single communication link, that individual will have to log off temporarily for purposes of receiving the telephone call. Confirmatory information is provided via the internet to the user. The automatically placed telephone call requests that the user feed back this confirmatory information for verification purposes. The telephone number which is being called is adjacent to the user's internet terminal. The user's response, via the telephone network, can be compared to the originally transmitted confirmatory information to determine whether the authentication or authorization process should go forward.

59 Claims, 18 Drawing Sheets

SYSTEM

FIG. 2A

AN OVERVIEW OF THE PROCESS 100

THE SITE VISITOR BEGINS THE REGISTRATION PROCESS AT THE TARGET SITE...

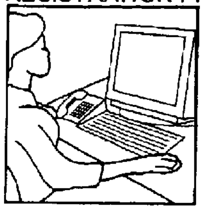

102
THE SITE VISITOR ENTERS THE TARGET SITE.

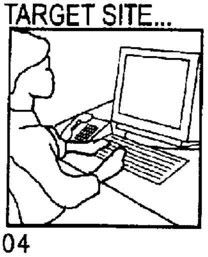

104
THE VISITOR REGISTERS ON THE TARGET SITE'S EXISTING REGISTRATION PAGE.

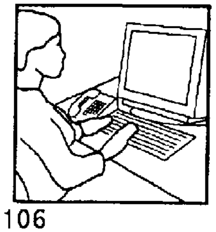

106
THE TARGET SITE CONFIRMS A PHONE NUMBER FOR THE VISITOR:

- THE TARGET SITE MIGHT ASK THE VISITOR IF A PHONE NUMBER STORED IN ITS SITE VISITOR RECORDS IS CORRECT; OR
- ASK THE VISITOR TO TYPE IN A PHONE NUMBER.

...IS TEMPORARILY TRANSPORTED TO THE SERVER, WHICH PLACES AN AUTOMATED PHONE CALL...

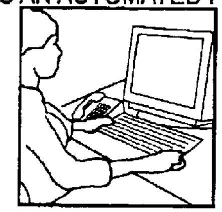

108
THE AUTHENTICATION/ AUTHORIZATION SERVER (HEREAFTER, "THE SERVER") ASSUMES CONTROL OF THE VISITOR'S BROWSER AND ASKS THE VISITOR IF A CALL CAN BE PLACED TO THE PHONE NUMBER WHILE THE VISITOR IS ONLINE.

- IF THE VISITOR ANSWERS "YES," THE ONLINE SESSION CONTINUES. THE SERVER DISPLAYS A CONFIRMATION NUMBER ONSCREEN.
- IF THE VISITOR ANSWERS "NO," THE SERVER:
  - DISPLAYS A CONFIRMATION NUMBER ONSCREEN, AS WELL AS THE URL OF A "FINISH REGISTRATION" WEB PAGE;
  - TELLS THE VISITOR TO TAKE NOTE OF BOTHE THE CONFIRMATION NUMBER AND THE URL ;THEN
  - INSTRUCTS THE VISITOR TO DISCONNECT FROM THE INTERNET

FIG. 2

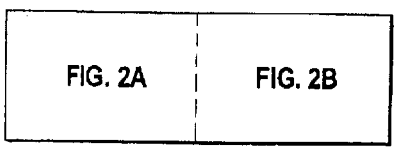

FIG. 2B

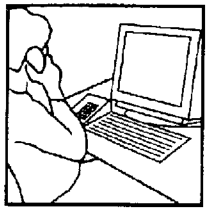

110
THE SERVER CALLS THE VISITOR ON THE PHONE:

- AN AUTOMATED CALL FIRST CONFIRMS THAT THE CALL RECIPIENT IS THE VISITOR AND IS EXPECTING THE CALL.

- AN AUTOMATED CALL THEN ASKS THE VISITOR TO TYPE THE CONFIRMATION NUMBER DISPLAYED IN THE ONLINE SESSION.

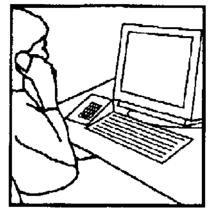

112
OPTIONALLY, AN AUTOMATED CALL CAN TELL THE VISITOR TO SPEAK INTO THE PHONE, SO THAT THE SERVER CAN MAKE ONE OR MORE DIGITAL VOICE RECORDINGS. IN A STANDARD IMPLEMENTATION, THE AUTOMATED CALL MIGHT REQUEST UP TO TWO DISTINCT VOICE RECORDINGS, SUCH AS THE VISITOR RECITING HIS OR HER NAME, AND THEN RECITING AN AGREEMENT TO TERMS.

- VISITORS WHO REMAINED ONLINE DURING THE CALL CAN THEN HANG UP THE PHONE.

- VISITORS WHO HAD TO DISCONNECT FROM THE INTERNET ARE REMINDED TO RETURN TO THE "FINISH REGISTRATION" WEB PAGE AFTER HANGING UP.

...AND RETURNS TO THE TARGET SITE TO COMPLETE THE PROCESS.

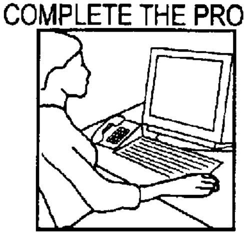

114
THE TARGET SITE REGAINS CONTROL OF THE VISITOR'S BROWSER AND RECEIVES A RESPONSE FROM THE SERVER DESCRIBING THE AUTOMATED TELEPHONE SESSION.

BASED ON THE SUCCESS OR FAILURE CODES IN THE SERVER RESPONSE, THE TARGET SITE DECIDES WHETHER THE VISITOR HAS SATISFIED THE REQUIREMENTS FOR REGISTRATION.

REGISTRATION SYSTEM

SYSTEM AND METHOD OF USING THE PUBLIC SWITCHED TELEPHONE NETWORK IN PROVIDING AUTHENTICATION OR AUTHORIZATION FOR ONLINE TRANSACTIONS

The benefit of a Dec. 15, 1999 filing date for Provisional Patent Application Ser. No. 60/170,808 is hereby claimed.

FIELD OF THE INVENTION

This invention relates generally to Internet security. More particularly, this invention relates to the method of attempting to verify the identity of an Internet user.

BACKGROUND OF INVENTION

The internet offers the prospect of expanded, world-wide commerce, e-commerce, with potentially lower cost to purchasers than heretofore possible. However, the lack of direct person-to-person contact has created its own set of problems. Identity theft is a problem threatening the growth of e-commerce.

E-commerce growth will only occur if there is a trusted and reliable security infrastructure in place. It is imperative that the identity of site visitors be verified before granting them access to any online application that requires trust and security. According to the National Fraud Center, its study of identity theft "led it to the inescapable conclusion that the only realistic broad-based solution to identity theft is through authentication." *Identity Theft: Authentication As A Solution, page* 10, *nationalfraud.com.*

In order to "authenticate" an entity, one must:

1) identify the entity as a "known" entity;
2) verify that the identity being asserted by the entity is its true identity; and,
3) provide an audit trail, which memorializes the reasons for trusting the identity of the entity.

In the physical world, much of the perceived security of systems relies on physical presence. Traditionally, in order to open a bank account, an applicant must physically appear at a bank branch, assert an identity, fill out forms, provide signatures on signature cards, etc. It is customary for the bank to request of the applicant that they provide one or more forms of identification. This is the bank's way of verifying the applicant's asserted identity. If the bank accepts, for instance, a driver's license in accepting as a form of identification, then the bank is actually relying on the processing integrity of the systems of the state agency that issued the driver's license that the applicant is who he/she has asserted themselves to be.

The audit trail that the bank maintains includes all of the forms that may have been filled out (including signature cards), copies of important documents (such as the driver's license), and perhaps a photo taken for identification purposes. This process highlights the reliance that a trusted identification and authentication process has on physical presence.

In the electronic world, the scenario would be much different. An applicant would appear at the registration web site for the bank, enter information asserting an identity and click a button to continue the process. With this type of registration, the only audit trail the bank would have is that an entity from a certain IP address appeared at the web site and entered certain information. The entity may actually have been an automated device. The IP address that initiated the transaction is most likely a dynamically-assigned address that was issued from a pool of available addresses. In short, the bank really has no assurance of the true identity of the entity that registered for the account.

To resolve this issue, many providers of electronic commerce sites have begun to rely on mechanisms that do not happen as part of the actual electronic transaction to help provide assurance that the transaction is authentic. These mechanisms are generally referred to as "out-of-band" mechanisms. The most frequently used out-of-band authentication mechanism is sending the end user a piece of mail via the United States Postal Service or other similar delivery services. The piece of mail sent to the end user will contain some piece of information that the site requires the end user to possess before proceeding with the registration.

By sending something (e.g., a PIN number) through the mail, and then requiring the end user to utilize that piece of information to "continue" on the web site, the provider of the site is relying on the deterrent effects of being forced to receive a piece of mail at a location, including but not limited to, the federal laws that are intended to prevent mail fraud. The primary drawback of using the mail is that it is slow. In addition, there is no audit trail. In this day and age of the Internet, waiting "7–10 days" for a mail package to arrive is not ideal for the consumer or the e-commerce site.

An authentication factor is anything that can be used to verify that someone is who he or she purports to be. Authentication factors are generally grouped into three general categories: something you know, something you have, and something you are.

A "something you know" is a piece of information which alone, or taken in combination with other pieces of information, should be known only by the entity in question or those whom the entity in question should trust. Examples are a password, mother's maiden name, account number, PIN, etc. This type of authentication factor is also referred to as a "shared secret".

A shared secret is only effective if it is maintained in a confidential fashion. Unfortunately, shared secrets are often too easy to determine. First, the shared secret is too often derived from information that is relatively broadly available (Social Security Number, account number). Second, it is difficult for a human being to maintain a secret that someone else really wants. If someone really wants information from you, they may go to great lengths to get it, either by asking you or those around you, directly or indirectly, or by determining the information from others that may know it.

A "something you have" is any physical token which supports the premise of an entity's identity. Examples are keys, swipe cards, and smart cards. Physical tokens generally require some out-of-band mechanism to actually deliver the token. Usually, some type of physical presence is necessary (e.g., an employee appearing in the human resources office to pick up and sign for keys to the building.)

Physical tokens provide the added benefit of not being "socially engineer-able", meaning that without the physical token, any amount of information known to a disreputable party is of no use without the token. A trusted party must issue the token in a trusted manner.

A "something you are" is some feature of a person that can be measured and used to uniquely identify an individual within a population. Examples are fingerprints, retina patterns, and voiceprints. Biometric capabilities offer the greatest form of identity authentication available. They require some type of physical presence and they are able to depict unique characteristics of a person that are exceedingly difficult to spoof.

Unfortunately, biometric devices are not yet totally reliable, and the hardware to support biometrics is expensive and not yet broadly deployed. Some biometric technology in use today also relies on an electronic "image" of the biometric to compare against. If this electronic image is ever compromised, then the use of that biometric as identity becomes compromised. This becomes a serious problem based on the limited number of biometrics available today. More importantly, biometrics cannot be utilized to determine an individual's identity in the first instance.

A security infrastructure is only as strong as its underlying trust model. For example, a security infrastructure premised upon security credentials can only address the problems of fraud and identity theft if the security credentials are initially distributed to the correct persons.

First-time registration and the initial issuance of security credentials, therefore, are the crux of any security infrastructure; without a trusted tool for initially verifying identity, a security infrastructure completely fails. The National Fraud Center explicitly noted this problem at page 9 of its report:

"There are various levels of security used to protect the identities of the [security credential] owners. However, the known security limitation is the process utilized to determine that the person obtaining the [security credential] is truly that person. The only known means of making this determination is through the process of authentication."

In any security model, the distribution of security credentials faces the same problem: how to verify a person's identity over the anonymous Internet. There are three known methods for attempting to verify a site visitor's identity. The three current methods are summarized below:

- Solution A: an organization requires the physical presence of a user for authentication. While the user is present, a physical biometric could be collected for later use (fingerprint, voice sample, etc.). The problem with the physical presence model is that it is extremely difficult and costly for a company to require that all of its employees, partners, and customers present themselves physically in order to receive an electronic security credential. This model gets more difficult and more expensive as it scales to a large number of users.
- Solution B: a company identifies and authenticates an individual based on a shared secret that the two parties have previously agreed upon. The problem with the shared secret model is that it in itself creates a serious security problem: shared secrets can easily be compromised. Since the shared secret is relatively easy to obtain, this security model suffers from serious fraud rates. Use of an electronic copy of a specific biometric like a thumbprint could be used as a shared secret. But once it is compromised, one cannot reissue a new thumbprint and there is a limited set of others to choose from.
- Solution C: a company relies on communication of a shared secret through the postal service. This process begins when the user registers at a web site and enters uniquely identifying information. A personal identification number (PIN) is then sent to the user at a postal mailing address (assuming the identifying information is correct). The user must receive the PIN in the mail, return to the web site and re-register to enter the PIN. The postal service is used because it is a trusted network; there is some assurance of delivery to the expected party and there are legal implications for breach of the network. A large flaw with this method is the built-in delay of days, even weeks, before the user receives the PIN. This mode of authentication is too slow by today's business standards; the potential of the Internet to transform the structure of commerce rests firmly on the ability to process transactions rapidly. Too many people simply never finish the process. Moreover, there is a limited audit trail to refer to in the event of a dispute regarding the use of the security credential. A signature (another type of biometric) could be required, but that triples the delay until the PIN is returned. Organizations are seeing large number of potential customers not returning to close a transaction after these delays.

Table I summarizes characteristics of the known authentication processes.

TABLE I

| | Authentication Processes | | |
|---|---|---|---|
| Characteristics | Physical Presence | Mail | Shared Secrets |
| Automated | | | ✓ |
| Easily Scalable | | ✓ | ✓ |
| Auditable | ✓ | ✓ | |
| Can use biometrics | ✓ | | |
| Has legal protections | ✓ | ✓ | |
| Occurs in real time, therefore tends to retain customers | | | ✓ |
| Deters fraud | ✓ | ✓ | |
| Protects private data | ✓ | | |

Known solutions do not enable organizations to distribute efficiently and securely electronic security credentials. There continues to be a need for improved authentication or authorizing methods. Preferably such improvements could be realized without creating substantial additional complexity for a visitor to a site. It would also be preferable if such methods did not slow down the pace of the interaction or transaction.

SUMMARY OF THE INVENTION

An automated system uses a publicly available communications network, such as the Public Switched Telephone Network (PSTN), wire line or wireless, to provide a real-time, interactive and largely self-service mechanism to aide in authentication (identity verification) and authorization (acceptance by a verified identity) for electronic transactions. Actions are coordinated between an electronic network (the Internet) and the Public Switched Telephone Network.

This coordination of an active Internet session with an active PSTN session can be used as a tool for verification. In one embodiment, it can be used to create an audit trait for any individual electronic transaction. These transactions may be, for example, the first-time issuance of an electronic security credential (e.g., passwords, digital certificates, PINs) or the verification of a security credential already issued. Other transactions, without limitation, come within the spirit and scope of the present invention.

A visitor who has logged onto a site to obtain goods, services, credentials, access or the like, all without limitation, is requested to enter or to specify a telephone number where he/she can be contacted during the current session (multi-line environment), or between segments of the present session (single line environment). Authentication/authorization software can at this time transmit specific confirmation information to the user's display. This is information available only to the transmitting software and the recipient.

The authentication/authorization software then places a call, via the public switched telephone network, to the site visitor. The site visitor, on receipt of the call from the software, is requested to key in via phone pad or to read back the confirmation information via the telephone network. If will be understood that the order and timing of the presentation and capture of confirmation information can be varied based on the application.

This "out of band" confirmation has the advantage that the confirmation information is delivered to the visitor immediately while on-line. In a multi-line environment, the visitor stays on-line and receives an automated phone call, at the identified phone number essentially immediately. The visitor provides immediate confirmation information feedback, to the software.

In addition to the confirmation information, the software can initiate a voice based exchange, with the user. This exchange can be stored to provide an audit trail. The same audit trail can include the called telephone number, the non-verbal confirmation information and/or any additional transaction related information.

Once the software has authenticated or authorized the visitor, the visitor can be transferred, with appropriate authorization or access indicia to transaction or access providing software.

In one embodiment, the coordination of an active Internet session with an active PSTN session implements a method for providing real-time, fully-automated, two-factor authentication of an Internet user. This invention is an improvement over the known process for helping to verify an Internet user's identity. The invention has benefits, illustrated in Table II, when compared to known processes:

TABLE II

| | Authentication Processes | | | |
|---|---|---|---|---|
| Characteristics | Telephone | Physical Presence | Mail | Shared Secrets |
| Automated | ✓ | | | ✓ |
| Easily Scalable | ✓ | | ✓ | ✓ |
| Auditable | ✓ | ✓ | ✓ | |
| Can use biometrics | ✓ | ✓ | | |
| Has legal protection | ✓ | ✓ | ✓ | |
| Occurs in real time, therefore tends to retain customers | ✓ | | | ✓ |
| Deters fraud | ✓ | ✓ | ✓ | |
| Protects private data | ✓ | ✓ | | |

The present method is usable in connection with:

- registration and issuance of Electronic Security Credentials (ESC)
- real time authorization of sensitive transactions (e.g., high financial value, age sensitive material, etc.)
- collection of payment information (e.g., credit card information).

The present system and method meet a significant number of the requirements necessary for effective first-time registration and subsequent maintenance of security credentials: speed, security, scalability and a strong audit trail. In one aspect, an automated, self-service tool to aid in quickly and reliably verifying a person's identity over the Internet is provided.

In another aspect, the Public Switched Telephone Network (PSTN) is a factor in authentication. The system contains mechanisms that enable the synchronization of a session established over an electronic network, such as the Internet, with a session established over the Public Switched Telephone Network (a phone call).

A person's ability to answer a phone call at their own phone number behaves as a "something you have" rather than a "something you know". In the case of a telephone number, it is easy for a disreputable party to determine your phone number (as a something you know), but it is far more difficult for the disreputable party to actually gain access to your phone to receive a call on the phone (as a something you have).

There is no law against knowing your phone number (even if it is unlisted), but there are laws against unauthorized access to the telephone line which your telephone number represents. A criminal's knowledge of your phone number allows him to call it, but he cannot answer it. The present system requires simultaneous or substantially simultaneous use of the phone and a nearby computer connected to the Internet.

In addition to using the PSTN as an authentication factor, the use of the PSTN also makes it possible to use a voice recording to create an audit trail. That voice recording could also be used as input for voice biometrics (one's voiceprint is a "something you are") as an additional factor of authentication. This would be especially useful if an electronic security credential must be re-issued to a traveling (i.e., away from a known telephone number) subject.

In another aspect, the system is configured such that a site owner can request any number of voice recordings, keypad entries, and web pages together to create a customized authentication application. A scripting component of the system provides this flexibility within the various applications running on the system.

The Scripting capability enables a given transaction to be validated in a distinct way. For instance one type of transaction might only require a phone call to be placed and a confirmation number to be entered. Another type of transaction may require four voice recordings along with a keypad entry of the year the site visitor was born.

In yet another embodiment, a transaction record of an authentication session can be created. The transaction record may include, as exemplary information; site visitor information, the site owner who sent the request, the acceptance recording, the name recording, the IP address of the site visitor, the confirmation number issued and entered, the phone number called, a trusted date/time stamp, and a digital signature of the information.

The transaction record provides a substantial evidentiary trail that the site visitor was the one who carried out the authenticating/authorizing transaction. This audit trail can also be used to allow the completion of future transactions, in the case of registration, for electronic security credential re-issuance based on voiceprint biometrics, or the human Help Desk equivalent—listening to the audit recording and comparing it to the Site visitor's voice on the phone.

This recorded audit trail may be made available to site owners via telephone, or via the Internet (using techniques such as streaming audio or audio file players). The audit trail can also be placed on a server allowing the site owner to retrieve the data at its own discretion.

It will be understood that communication between a target site and an authentication/authorization service can take place in various ways. In one form, the authentication service can accept a redirect from the target site and take control of the network session with the site visitor. Alternately, the target site can maintain control of the network session with the visitor and communicate with the authentication/authorization service via a separate independent network session.

Numerous other advantages and features of the present invention will become readily apparent from the following detailed description of the invention and the embodiments thereof, from the claims and from the accompanying drawings in which details of the invention are fully and completely disclosed as part of this specification.

BRIEF DESCRIPTION OF THE DRAWINGS

FIG. 2 is a diagram which illustrates the steps of a method in accordance with the present invention;

DETAILED DESCRIPTION OF THE INVENTION

Figure 1:
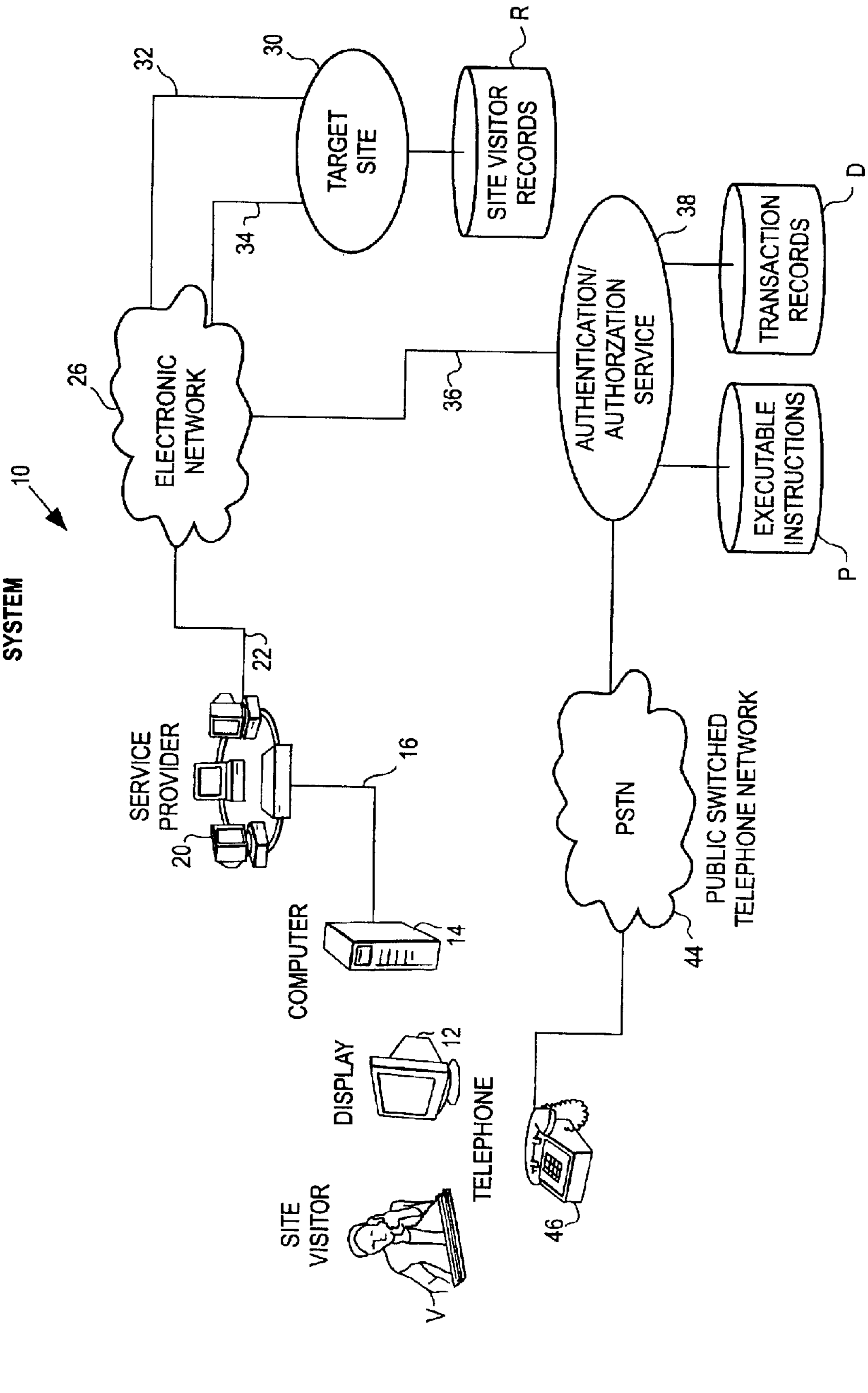
FIG. 1 is a block diagram of a system in accordance with the present invention.

While this invention is susceptible of embodiment in many different forms, there are shown in the drawings and will be described herein in detail, specific embodiments thereof with the understanding that the present disclosure is to be considered as an exemplification of the principles of the invention and is not intended to limit the invention to the specific embodiments illustrated.

FIG. 1 illustrates a system 10 for carrying out an interactive, authentication/authorization process. In one aspect, system 10 as discussed below can be implemented using a multi-line approach. Alternately, a single line approach can be used.

The system 10 includes a site visitor's display 12 and associated local computer 14. The site visitor V, via a bi-directional communication link 16 can access, forward requests to and receive services from an internet service provider 20. The internet service provider 20 which would be coupled via bi-directional communication links 22 communicates via an electronic network 26, which could be the publicly available internet or a private intranet with a target site 30 via a bi-directional communication link 32.

In a typical transaction, the visitor V logs onto target site 30 and requests, authorization, authentication or other services alone or in combination from the site 30. In response to one or more requests from the visitor V, the site 30, via a bi-directional communication link 34 and the network 26 communicates via another link 36 with an authentication/authorization server 38.

Server 38 includes authorization/authentication software in the form of prestored executable instructions P. It also includes data bases D wherein information is stored in connection with prior transactions, or, previously supplied information provided by target site 30.

The authentication/authorization server 38 makes it possible to authenticate or authorize the site visitor V in accordance with the present invention. The server 38 receives either from target site 30 or directly from visitor V a telephone number where the visitor V can be called or reached essentially immediately.

The server 38 includes executable instructions P for implementing either a multi-line environment wherein the visitor V can communicate by telephone simultaneously while being on-line with the server 38 or a single line environment wherein the visitor V must log off so as to receive the telephone called discussed subsequently and then log back on again.

In a multi-line environment, the server 38 interacts in real time with the visitor V both via the network 26 and via the switched telephone network 44. In this circumstance, prior to the telephone call, the authentication/authorization software P transmits, via the network 26, confirmation information. This information appears on the visitor's display 12.

Confirmation information can include alphanumeric sequences of information of a type the visitor V can key in or audibly speak into a telephone 46. The server 38 then automatically places a telephone call via the network 44 to the phone 46 using the number supplied by the site visitor V.

The server 38 can, once the visitor V has picked up the telephone 46, verbally confirm with the visitor V that it is in fact the individual who has logged onto site 30 and that that individual is in fact expecting a call at that telephone. The server 38 then verbally requests the visitor V to key or speak the confirmation information which has just been received on display 12.

The server 38 can also request that the visitor V speak into the telephone 46 for purposes of creating one or more stored voice files usable as part of an audit trail.

Assuming that the appropriate confirmation information has been fed back by the visitor V to the server 38 using the network 44, the server 38 can direct the visitor V to terminate the telephone call. The server 38 can then compare the received confirmation information to the transmitting confirmation and determine if they are the same. Control of the visitor's browser can then be returned to target site 30 along with a message confirming the identify of the visitor V or providing authorization information in connection with a transaction based on initial information stored in data base D of server 38. Either one alone or both of servers 38 and site 30 can be involved in making the authentication/authorization decision. The site 30 then continues the transaction and communicates directly with a visitor V.

It will be understood that a variety of types of confirmation information can be transmitted via server 38 to the visitor V using the out-of-band transmission link, namely the public switched telephone network 44. Similarly, a variety of responses by the visitor V to the server 38 can be forwarded to site 30, if desired, to be used to make the authentication/authorization decision.

FIG. 2 illustrates the steps of a process 100 implemented by the system 10. In a step 102, the visitor V logs onto target site 30 and in a step 104, provides preliminary identification information. In a step 106, the site 30 confirms a telephone number with the visitor V at which the visitor can be immediately reached. The site 30 then redirects the visitor along with the visitor's phone number to server 38.

In a step 108, server 38 assumes control of the visitor's browser and inquires of the visitor if a call can be placed at that phone number while the visitor is on-line. In a multi-line environment, where the user answers "yes", the on-line session continues with the server 38 forwarding a confirmation code via network 26 which is in turn presented on display 12.

In a step 110, the server 38 places a telephone call to the provided phone number via the network 44 which should produce ringing at phone 46 which in turn is picked up by visitor V. The server 38 can then confirm that the visitor V, the call recipient, is expecting the call. The server 38 then requests that the visitor V either speaks or types the confirmation information on display 12.

In addition to analyzing the confirmation information fed back via network 44, the server 38 in a step 112 can request that the visitor V make predetermined voice statements such as reciting his or her name and then reciting an agreement to terms of a proposed transaction.

Visitors who remain on line during the call can then hang up the telephone and terminate the conversation. Visitors who had to be disconnected for purposes of making the telephone call via the network 44 are reminded to log back onto the site 30 and complete the registration step 104.

The server 38 then returns control of the visitor's browser in a step 114 to site 30. The site 30 then using its internal software determines whether the visitor V has satisfied the necessary requirements to permit the transaction to continue.

Figure 3:
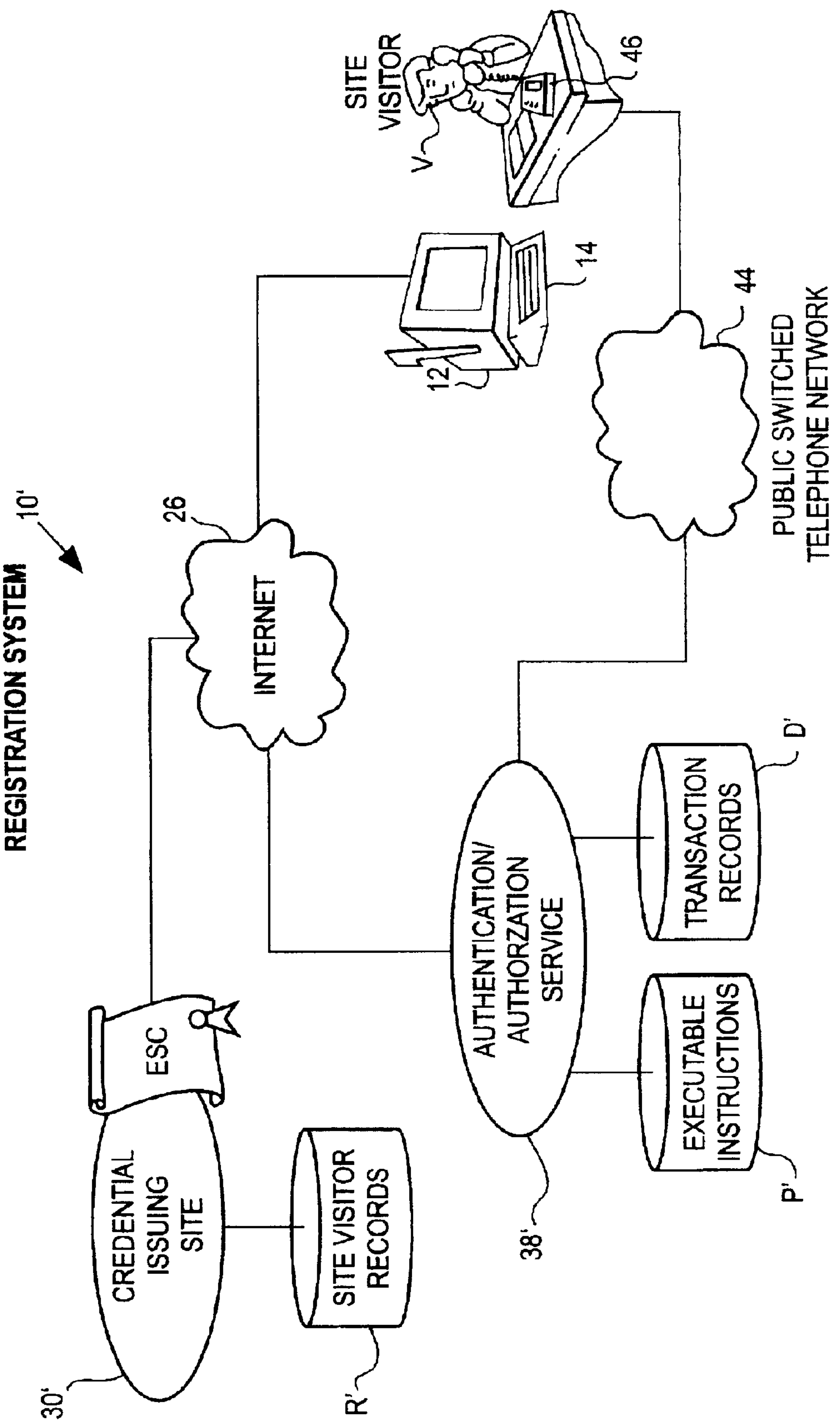
FIG. 3 is a block diagram of the system of FIG. 1 for implementing a registration process.
Figure 4:
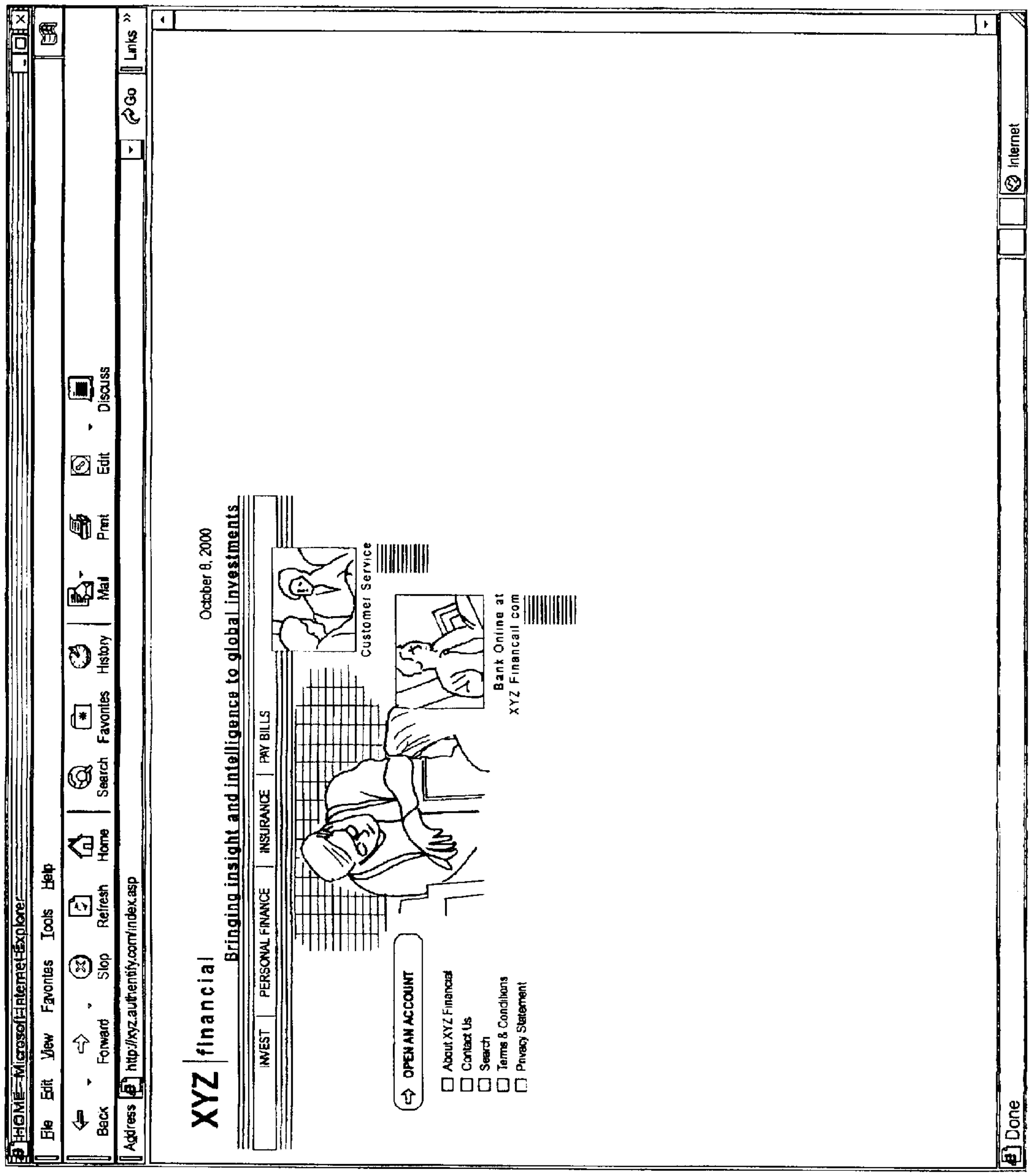
FIG. 4 is a copy of a visitor's screen displayed to initiate a registration process.
Figure 5:
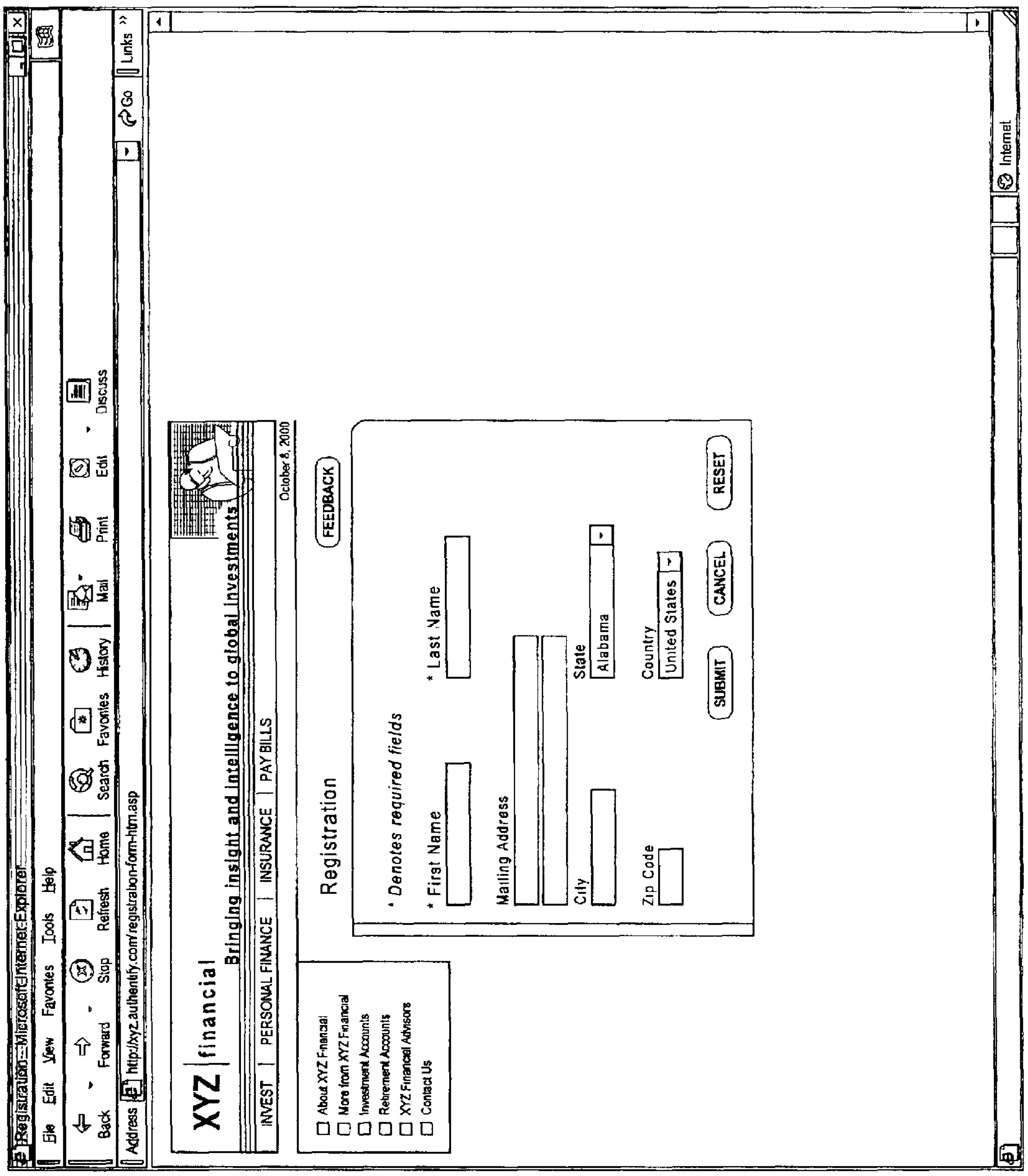
FIG. 5 is a view of a visitor's prompt screen for submitting information.
Figure 6:
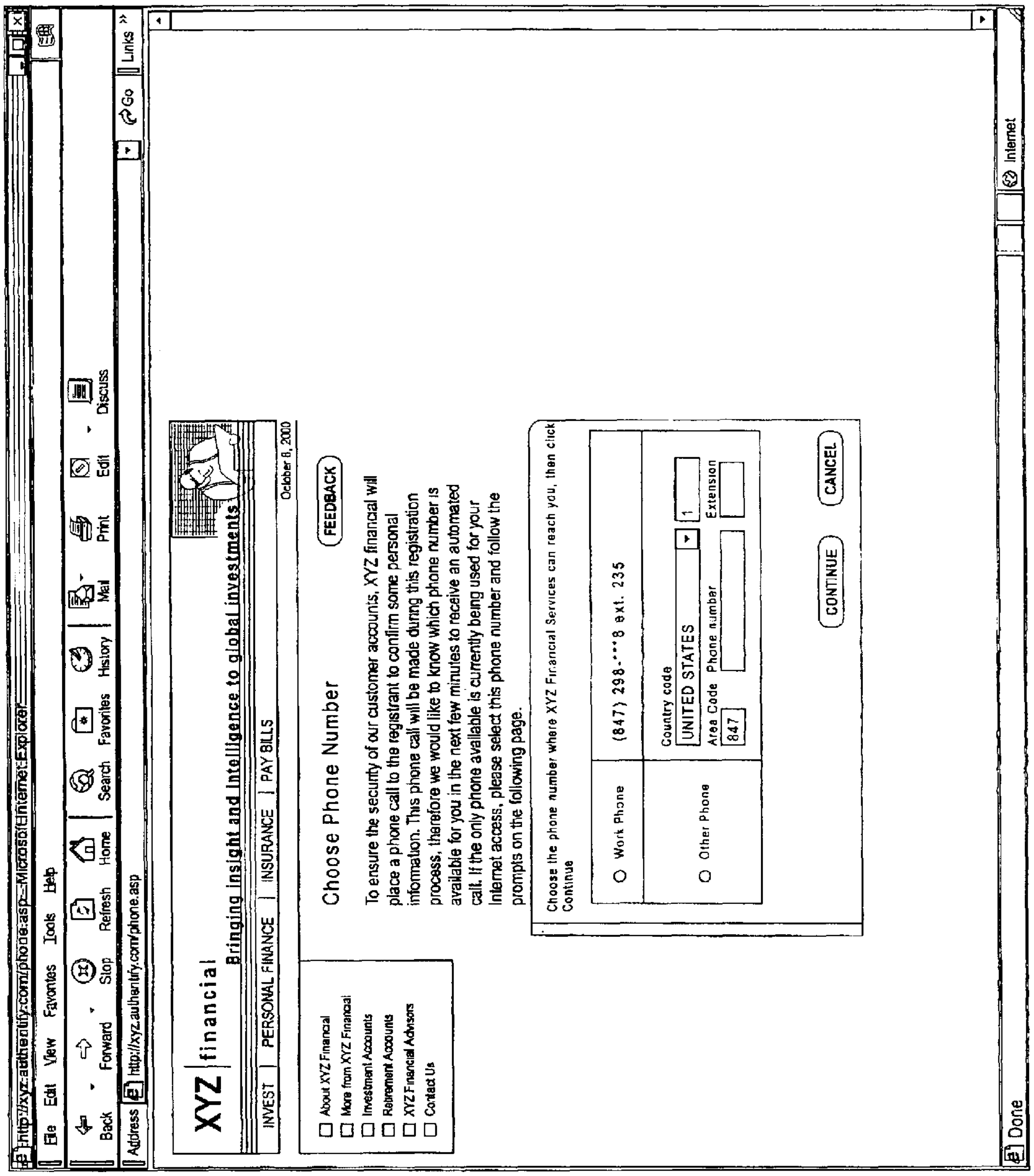
FIG. 6 is a view of a visitor's screen for submitting or selecting a phone number.
Figure 7:
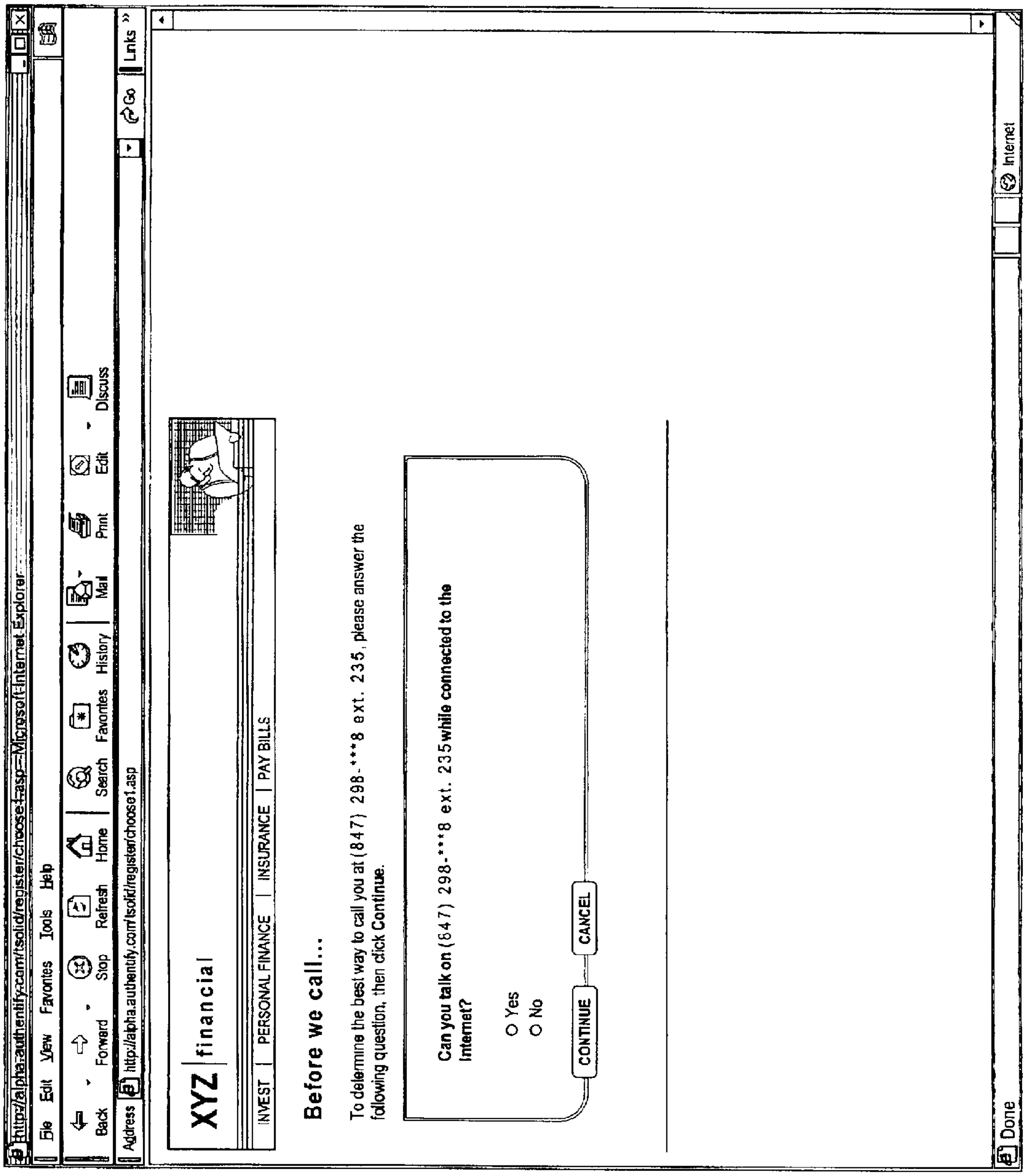
FIG. 7 is a copy of a visitor's screen querying the visitor about his/her ability to answer a telephone call simultaneously while connected to the internet.
Figure 8:
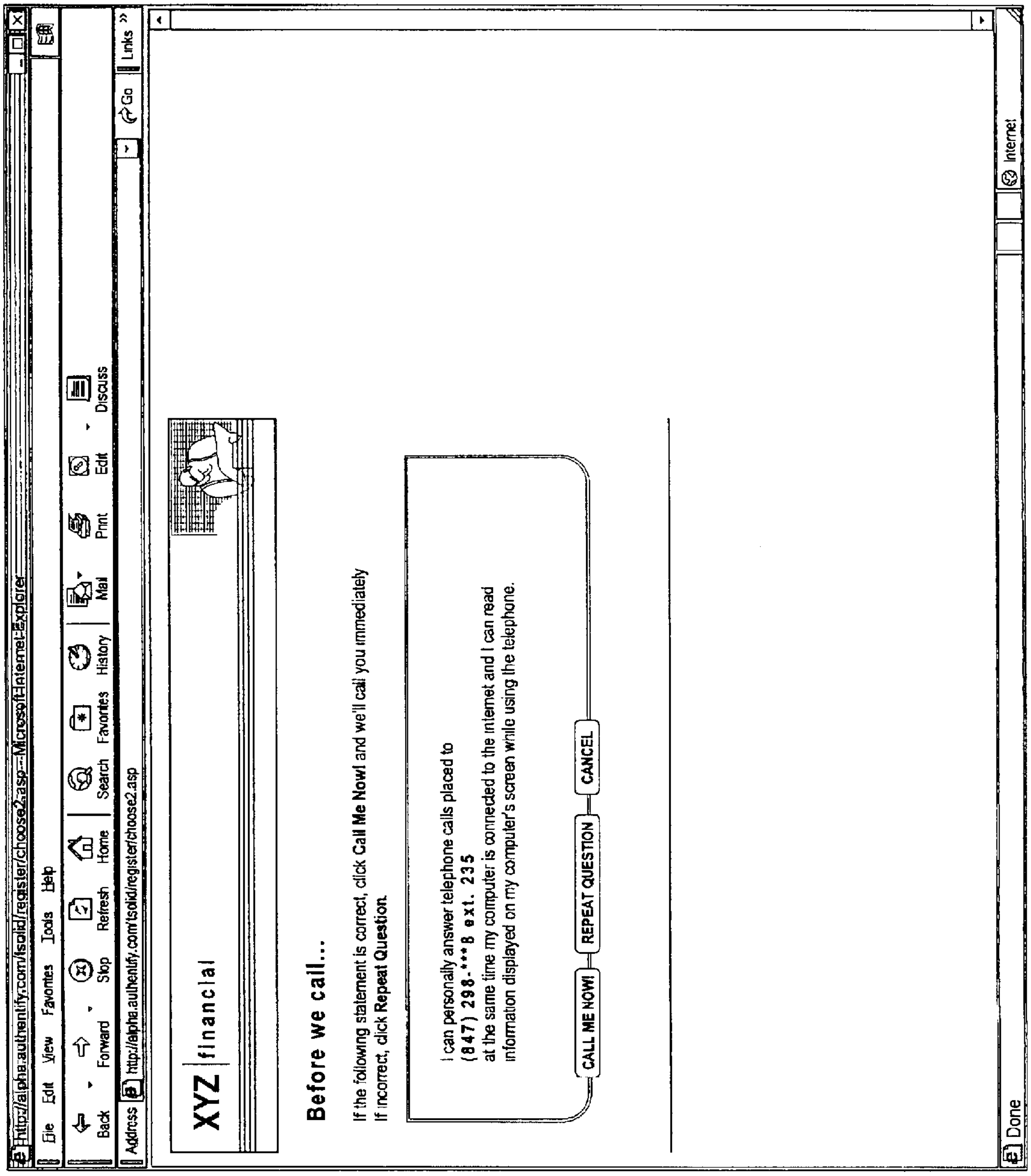
FIG. 8 is a reconfirmation of the information provided on the screen of FIG. 7.
Figure 9:
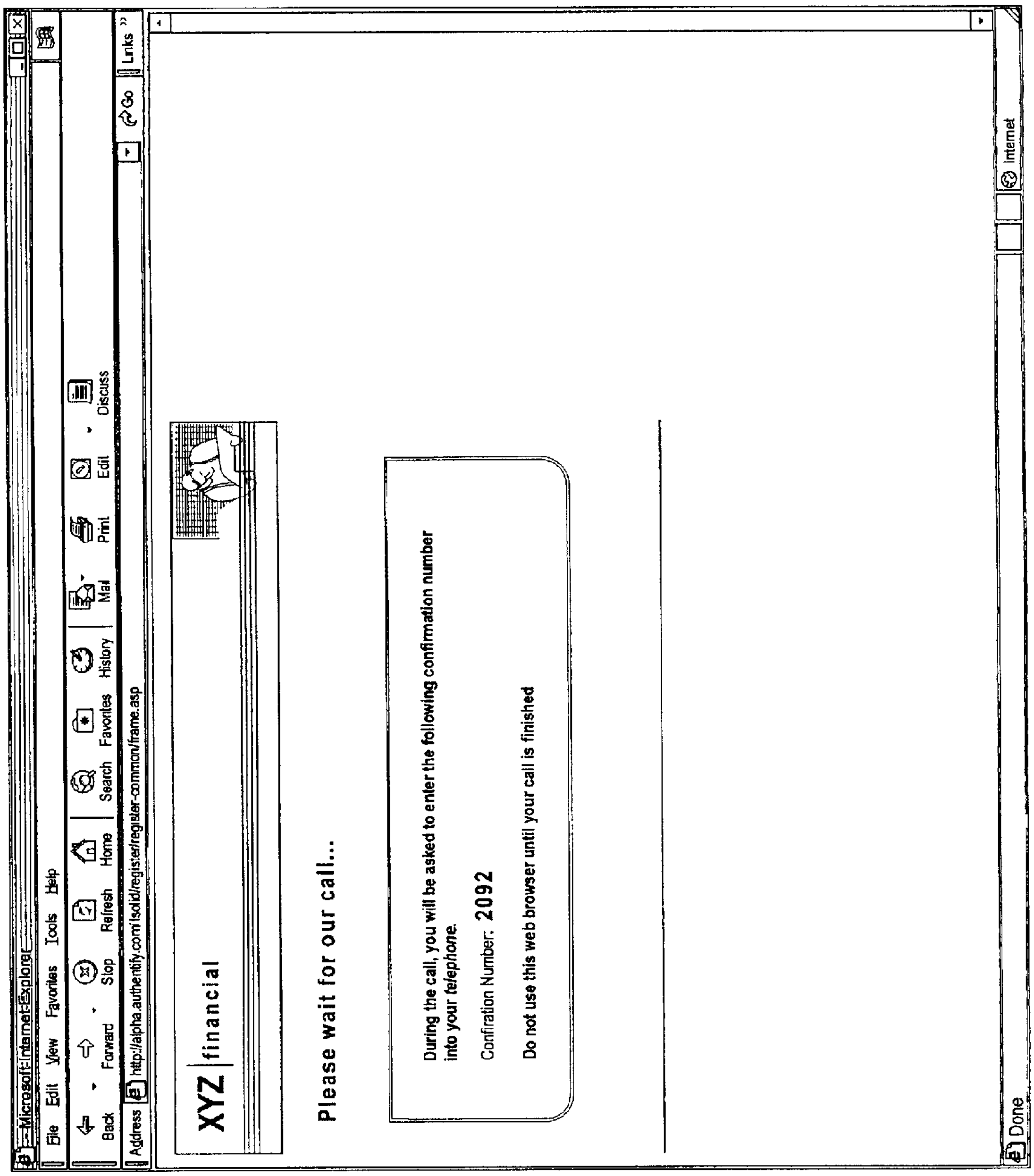
FIG. 9 is a copy of a visitor's screen informing the visitor that an automated call is being placed to him/her while on-line.
Figure 10:
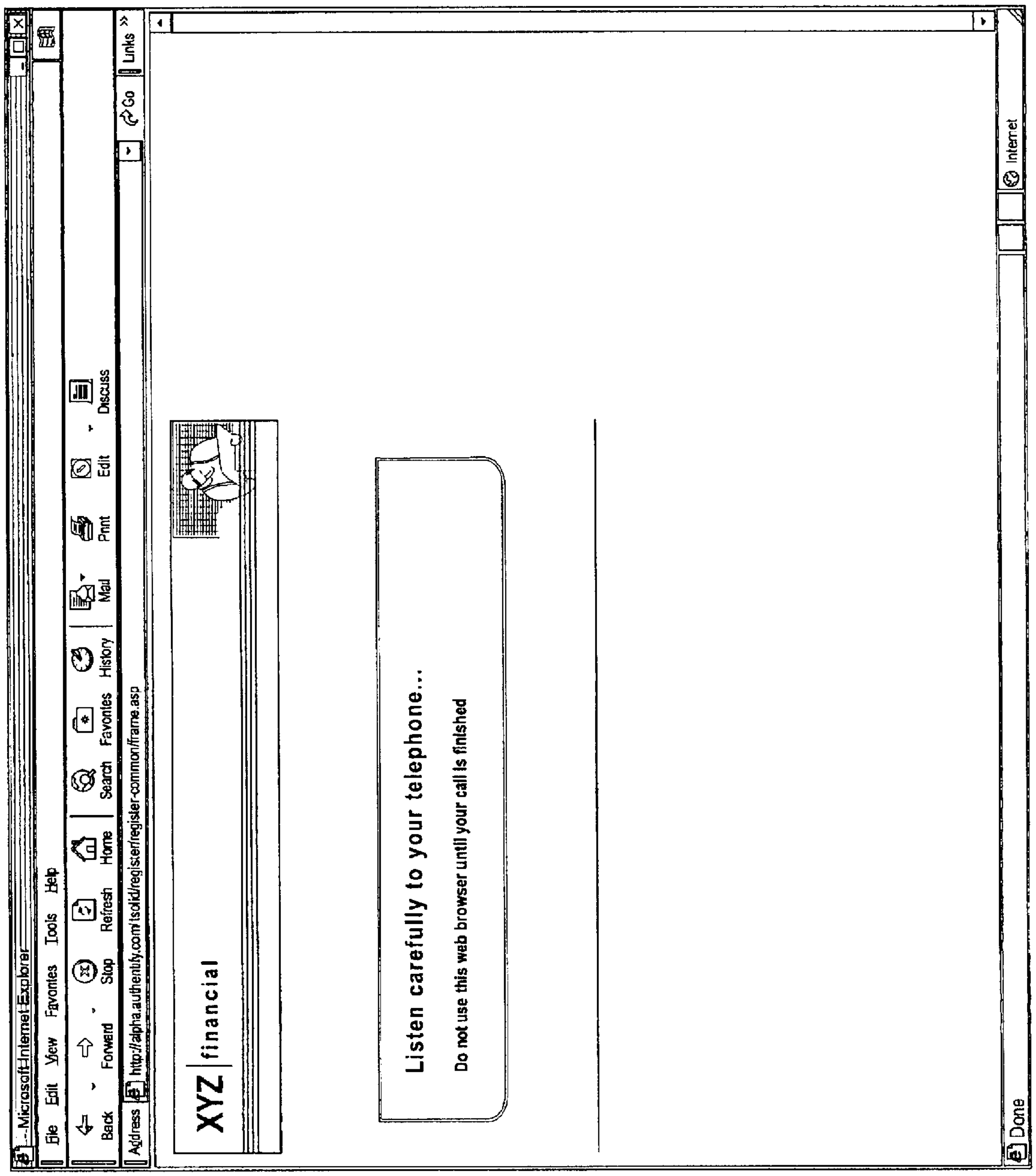
FIG. 10 is a view of a visitor's screen prompting the visitor to listen to an audible message presented via telephone.
Figure 11:
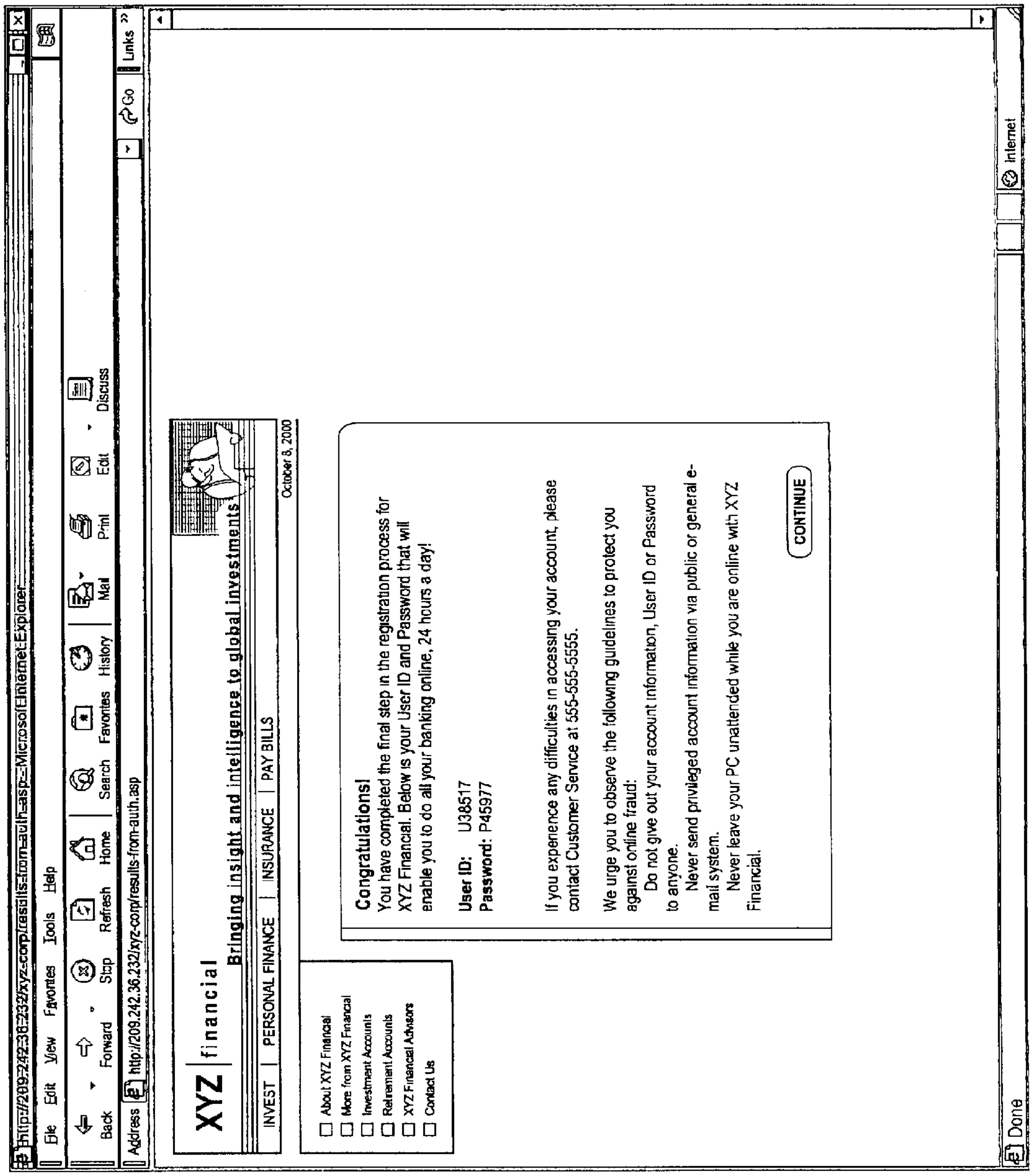
FIG. 11 is a visitor's screen illustrating a final step of the registration process.
Figure 12:
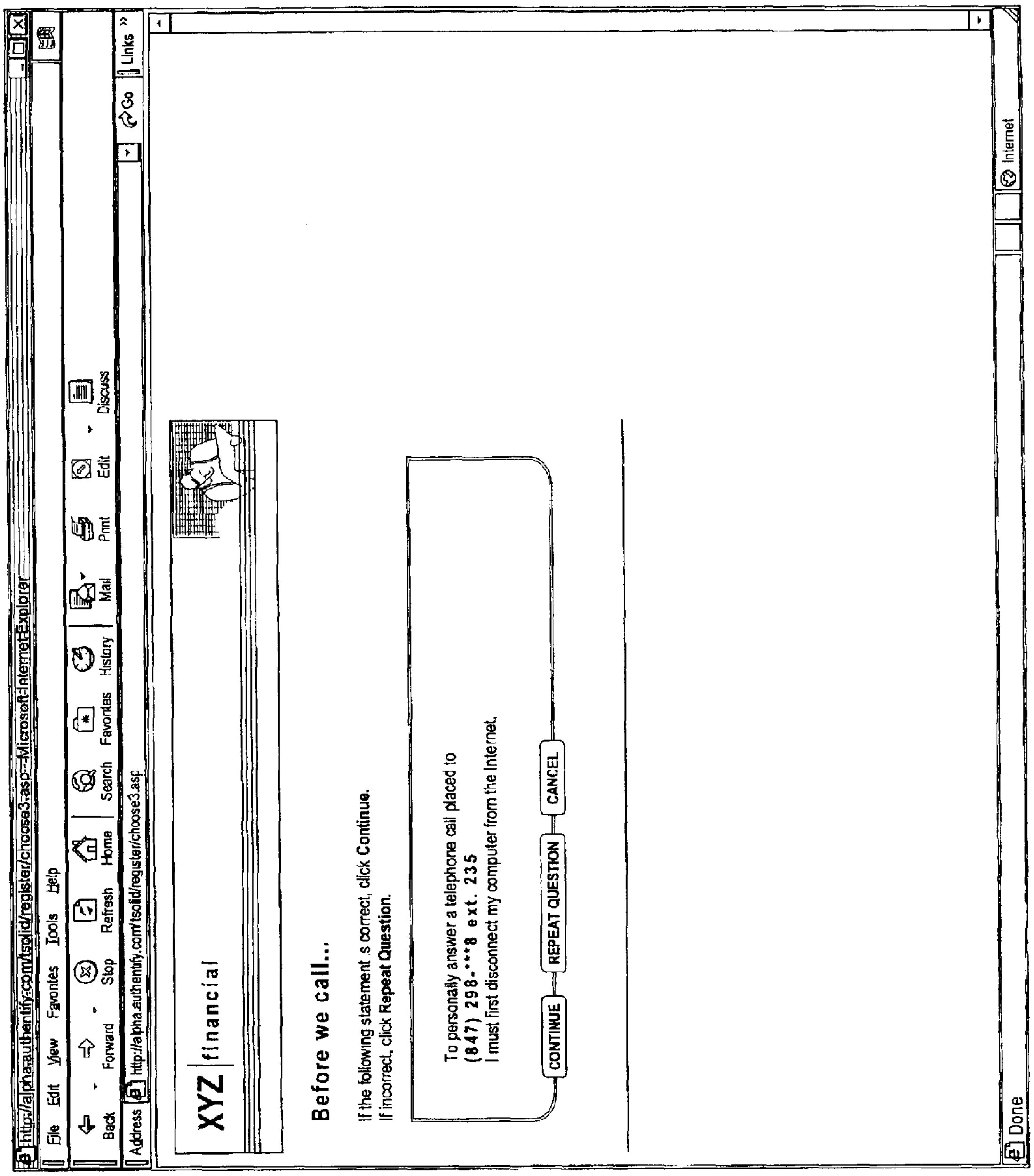
FIG. 12 is a visitor's screen reconfirming that the visitor must disconnect before answering a telephone call.
Figure 13:
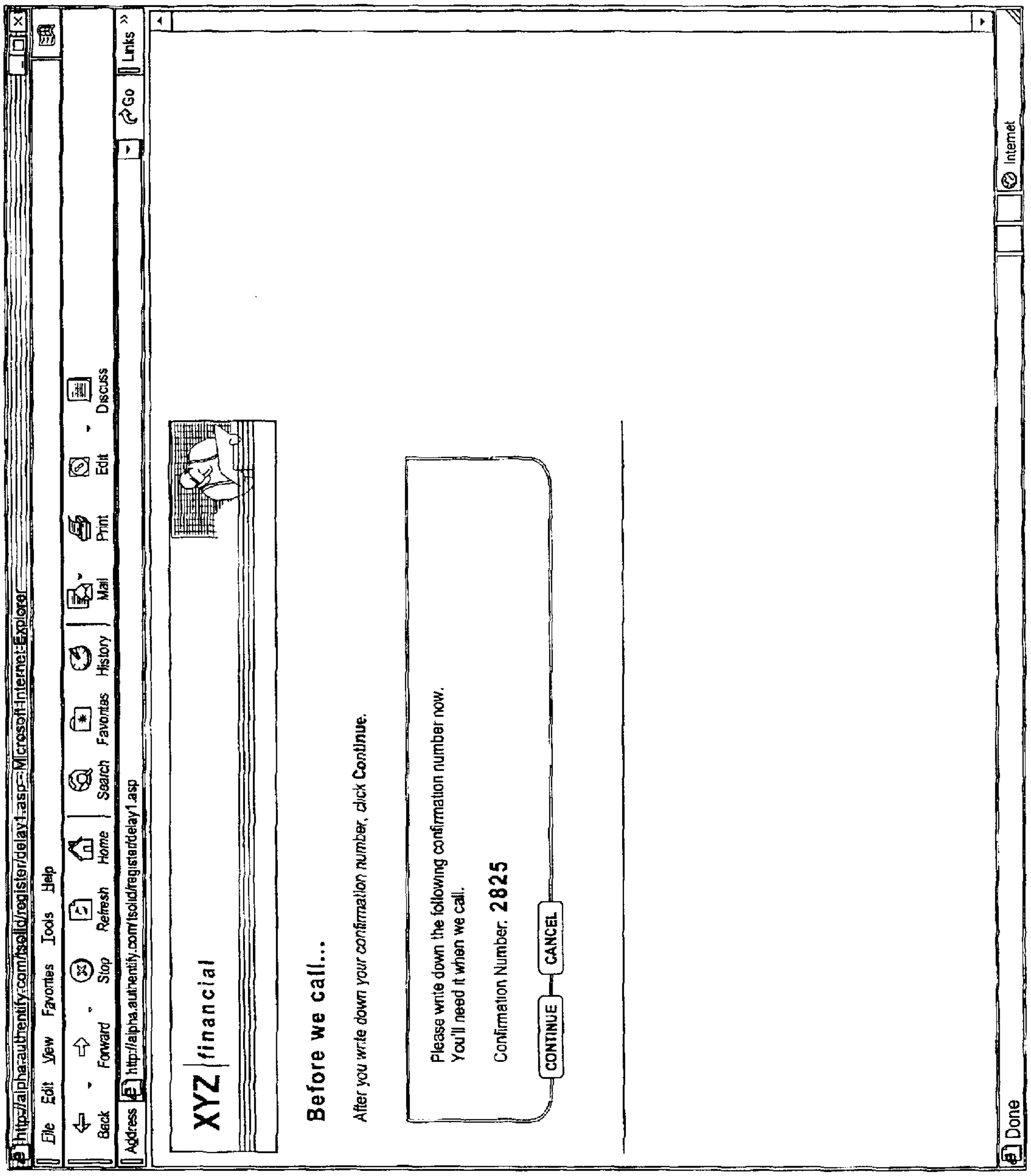
FIG. 13 is a screen which presents confirmation information to the visitor with instructions.
Figure 14:
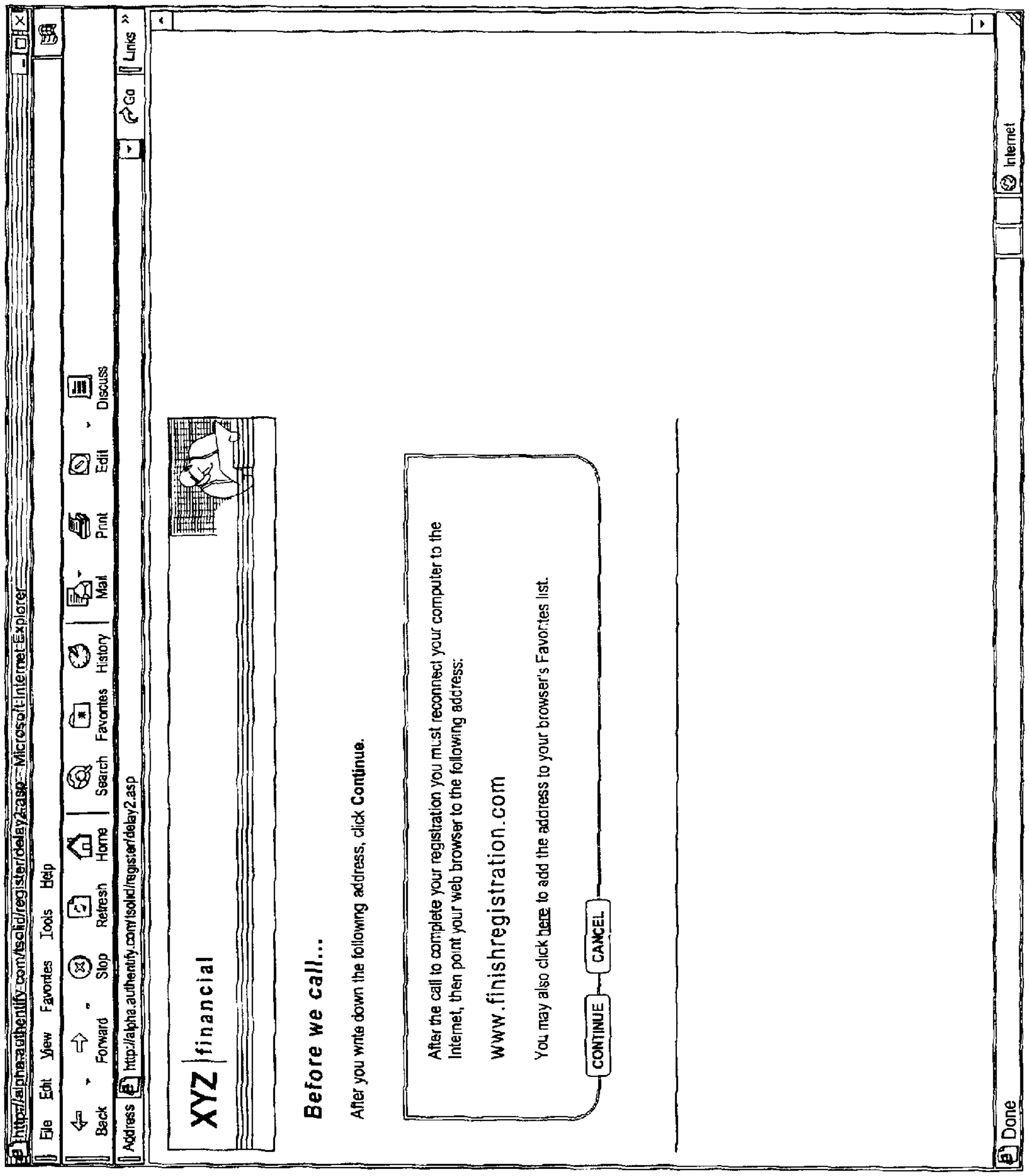
FIG. 14 is a visitor's screen illustrating instructions for proceeding after the telephone call has been concluded.
Figure 15:
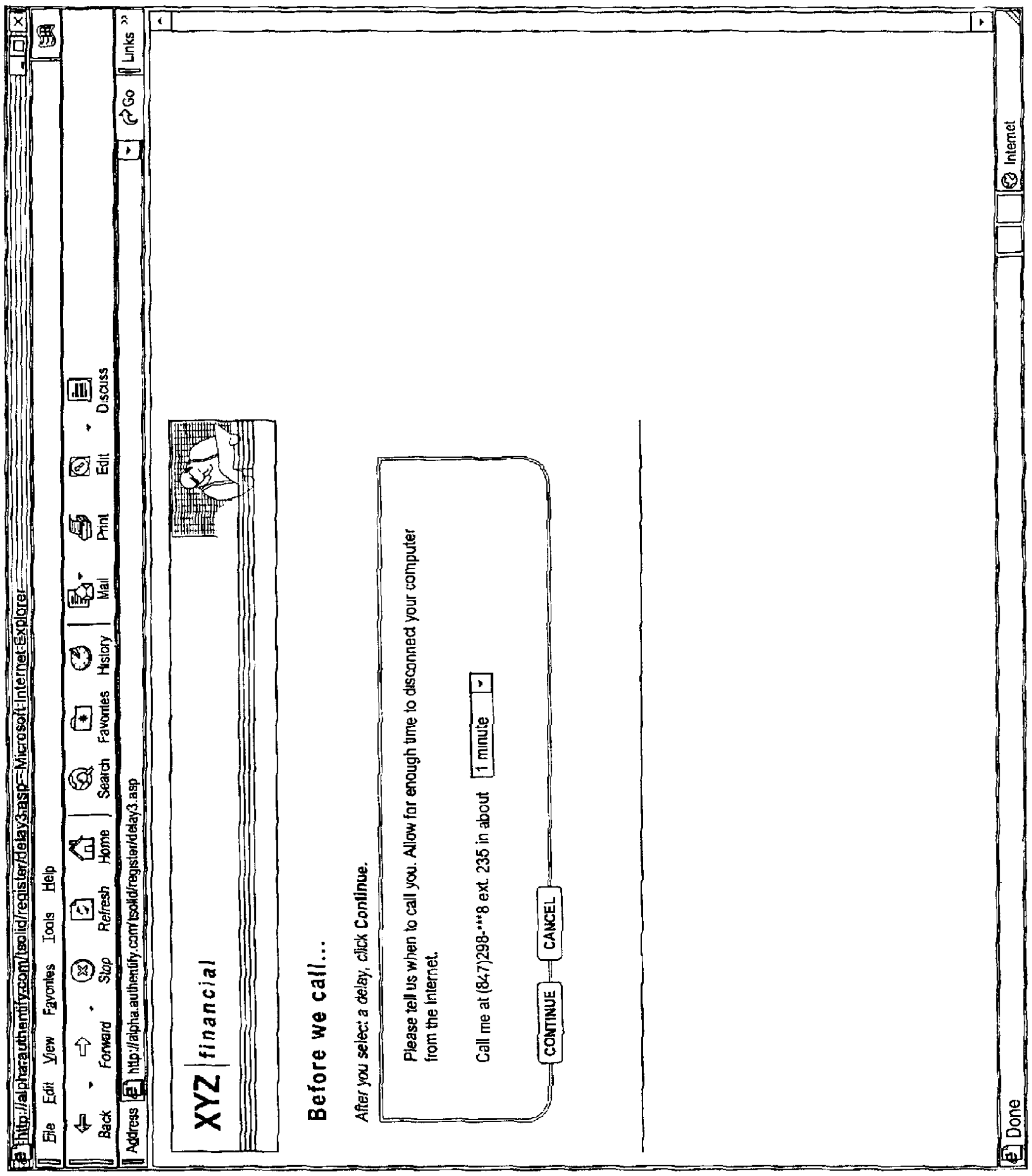
FIG. 15 is a screen requesting that the visitor specify how much time is needed to log off the internet.
Figure 16:
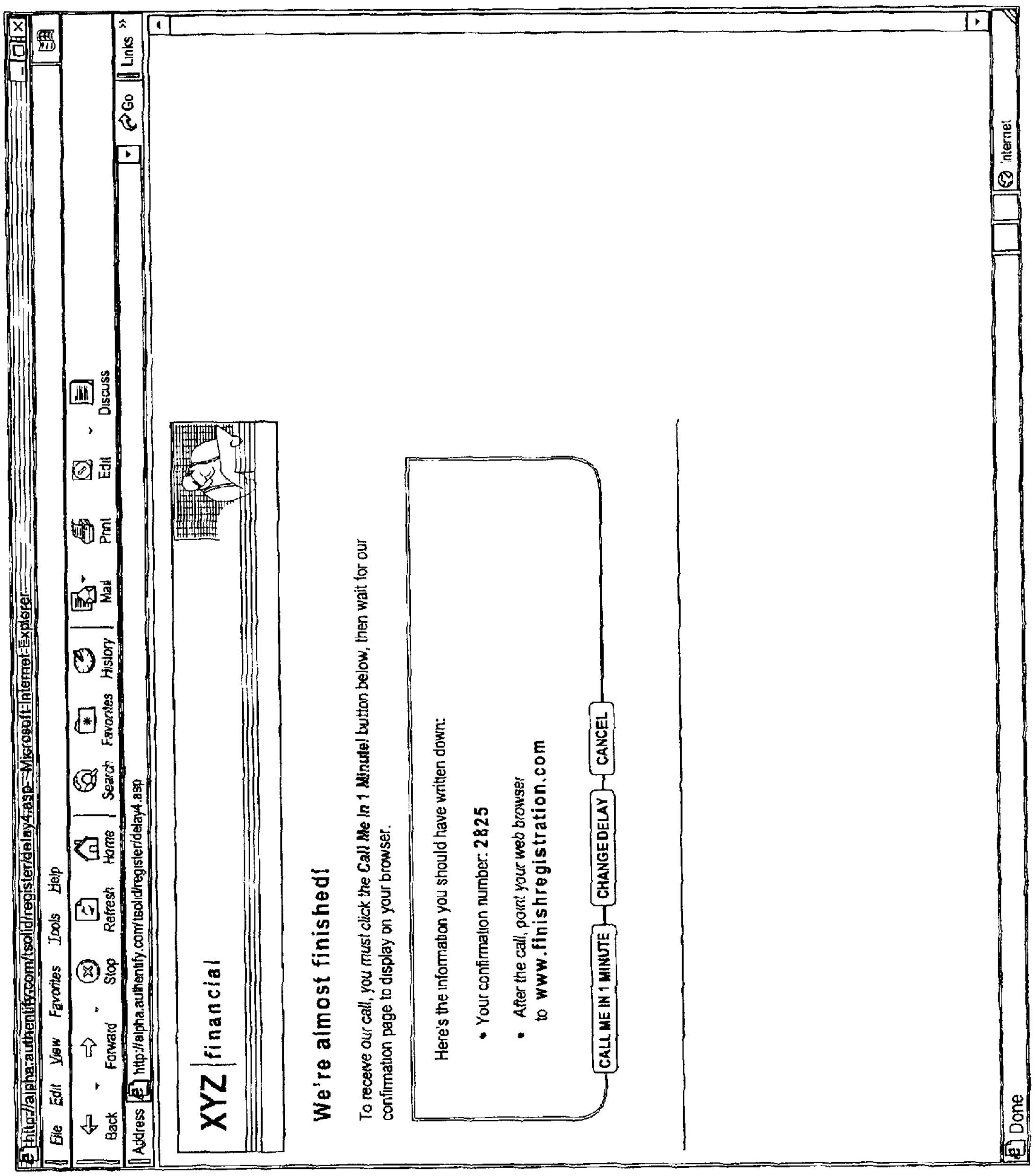
FIG. 16 is a reconfirmation of the confirmation information previously presented on FIG. 13.
Figure 17:
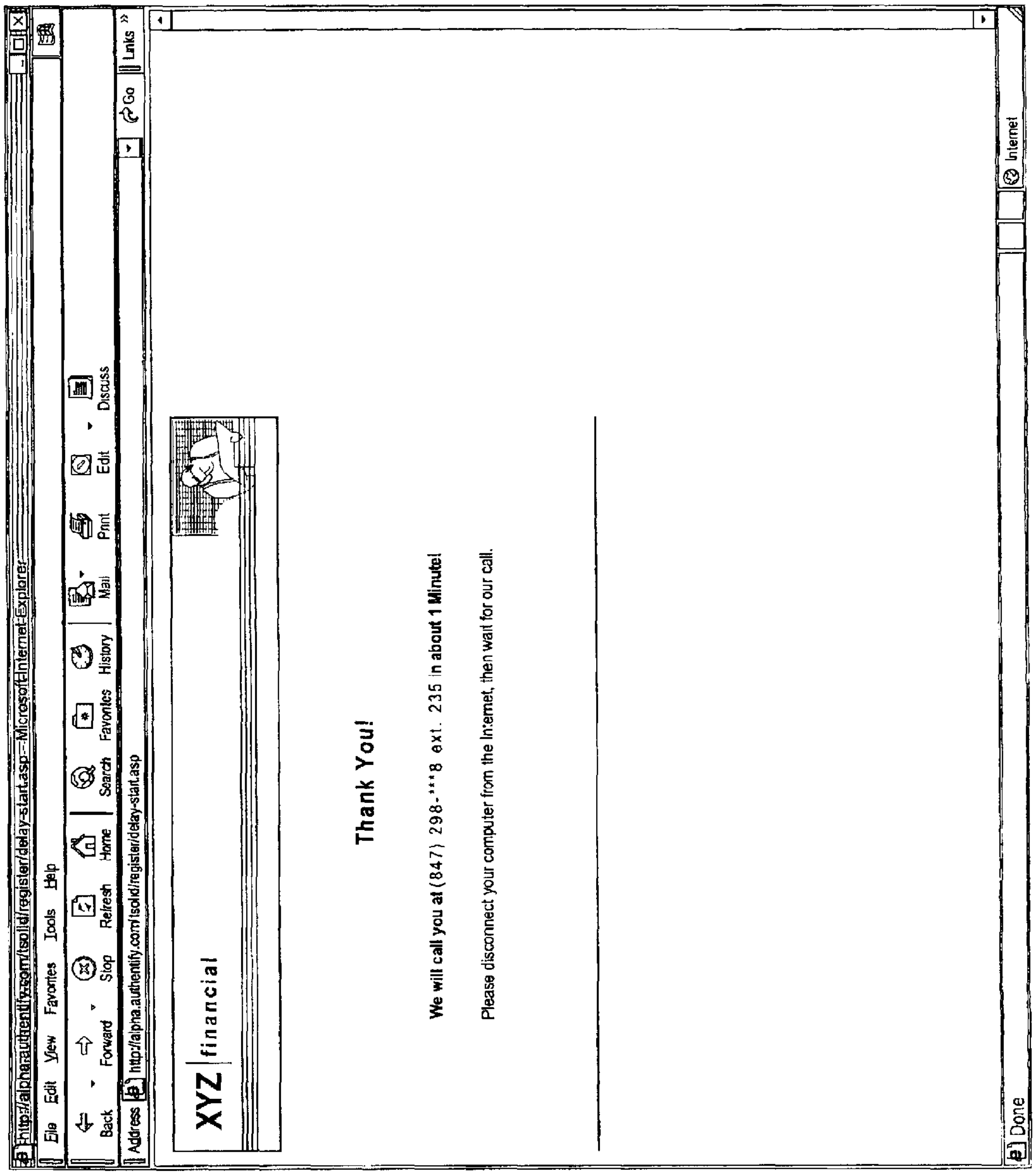
FIG. 17 is a log-off screen prior to the telephone call being placed to the visitor.

The following discussion and associated figures illustrate the flow where server 38 assists a credential issuing site 30' in registering visitor V, see FIG. 3.

In the following scenario, Site Visitor V is an individual who has logged onto web site 30' to apply for the Electronic Security Credential. "ESC" stands for Electronic Security Credential. "SO application" refers to the registration application software that runs at the "Site Owner's" facility 30'.

In the following tables, numbered steps in the left-most column which contain numbers in BOLD and UNDERLINED refer to interactions on the server 38'. The steps that are not in bold refer to interactions that the site visitor V is having on the site owner's system 30'.

FIGS. 4–17 illustrate the associated, exemplary Internet browser screens which are referenced within the Internet Session column of Table 3.

Two scenarios are represented in Table III and IV. Table III labeled "Immediate Synchronization" refers to a session where the site visitor V has an Internet connection that does not interfere with the previously discussed automated telephone call. Table IV labeled "Delayed Synchronization" refers to the site visitor V using the same telephone line for the internet connection as is to be used for receiving the authentifying telephone call.

IMMEDIATE SYNCHRONIZATION - TABLE III

Immediate synchronization occurs when the visitor V is using a different communications link for the internet connection than is being used for the automated call from the server 38, FIG. 1 or 38', FIG. 3.

TABLE III

Immediate Synchronization
Immediate synchronization occurs when the visitor V is using a different communications link for the internet connection than is being used for the automated call from the server 38, FIG. 1 or 38', FIG. 3.

| Step | Internet Session | PSTN Session | Comments |
|---|---|---|---|
| 1 | Site visitor V arrives at a prescribed web site 30' to initiate the registration process. (FIG. 4) | | |
| 2 | Site visitor enters information into the Site Owner's (SO) application as prompted by the web page and submits the information, (FIG. 5) | | Information to be collected will be prescribed by the issuer of the ESC, and for exemplary purposes could contain identifying information such as name, address, SSN, employee number, account number, mother's maiden name, etc. |
| 3 | SO application uses information submitted by Site visitor to query a data store and determine if the information provided by the site visitor identifies an entity to which an ESC is to be issued by the system. (FIG. 5) | | The Site Visitor information collected can be validated, reviewed for inconsistencies, and associated with an existing identity within the SO's system. |
| 4 | In one embodiment, the SO application displays a list of locations for telephone | | |

TABLE III-continued

Immediate Synchronization
Immediate synchronization occurs when the visitor V is using a different communications link for the internet connection than is being used for the automated call from the server 38, FIG. 1 or 38', FIG. 3.

| Step | Internet Session | PSTN Session | Comments |
|---|---|---|---|
| | numbers maintained in the data store for the entity just identified. This list could be rendered as the location names, the entire telephone number, or a masked number (555-555-***5), and presented back to the Site visitor in a web page. The web page asks the Site visitor to identify at which of the listed locations Site visitor can be reached at this time. There are several other alternates from which the issuer of a credential could choose. These include: • Actual phone numbers may be presented (instead of location names) • The site visitor may be prompted to enter a phone number A combination of location name and last four digits of the number may be used to increase accuracy while maintaining privacy. (FIG. 6) | | |
| 5 | Site visitor identifies the number of the telephone at which he/she can be reached, either by selecting a number or representative location name or by entering the number. This information is then submitted. (FIG. 6) | | This information is submitted to the Register system, server 38'. Therefore, after the site visitor selects a number and clicks submit, he/she is redirected to the Register server 38'. The site visitor will be unaware of this transfer because the web pages will look similar to the SO application |
| 6 | Server 38' presents a web page querying the site visitor about his/her ability to answer a call placed to a certain number while connected to the Internet. Example question is "Can you talk on 555-555-***5 while connected to the Internet?" (FIG. 7) | | This question is presented to the Site Visitor in order to determine if the site visitor can receive the automated telephone call while connected to the Internet. Alternately, they have to disconnect their computer in order to receive a telephone call. |
| 7 | Server 38' then presents a web page to the site Visitor which reconfirms the decision he/she made on the previous page. If the site visitor answered "YES" to the question above then the following text would be displayed. "I can personally answer calls placed to 555-555-***5 at the same time my computer is connected to the Internet and I can read information displayed on my computer's screen while using the telephone" (FIG. 8) | | This web page allows the site visitor to confirm that he/she can receive a telephone call while they are connected to the Internet. It also allows the site visitor to go back to the previous question if the statement that is presented to him/her is incorrect. |
| 8 | Server 38' displays a web page telling the site visitor that an automated call is being placed to them. The web page also contains a | Automated telephone call is placed to the prescribed number that the site visitor has requested. | At this point, Server 38' will employ a state management technique that will enable the active internet session to be coordinated with the PSTN |

TABLE III-continued

Immediate Synchronization
Immediate synchronization occurs when the visitor V is using a different communications link for the internet connection than is being used for the automated call from the server 38, FIG. 1 or 38', FIG. 3.

| Step | Internet Session | PSTN Session | Comments |
|---|---|---|---|
| | confirmation number or alphanumeric string (Conformation information) (FIG. 9) | | session (telephone call). Error conditions (busy signal, switchboard, etc.) must be appropriately handled. "Appropriate" handling will be dependent upon the requirements of the owner of the credential. Examples are: • If the line is busy, fail • If the line is busy, retry after pause |
| 9 | Same web page is displayed as in step 8. (FIG. 9) | Once answered, Server 38' will respond with an identifying greeting such as: "Hello, this is XYZ Corporation's automated telephone call. If you are expecting this call, press pound. Otherwise please hang-up." | The actual content of the greeting can be controlled by site 30' or Server 38' or both without limitation. The Server 38' can, as an option, require a positive action to have the person who answered the phone acknowledge an identity. For the duration of the PSTN session, Server 38' will provide the site visitor the ability to receive help at any time. If the site visitor presses the help key (* key on the telephone), the system will react per the requirements of the site owner. |
| 10 | Same web page is displayed as in step 8. (FIG. 9) | Server 38' will instruct the site visitor to enter the confirmation number from the web page into the telephone: "Please enter the confirmation number displayed on your computer screen using your telephone keypad, then press pound." site visitor to retry the | Once the site visitor has entered the confirmation number from the web page into the telephone. The Server 38' expects that whoever is using the web browser is the same person who is on the telephone call. The Server 38' will allow the confirmation number many times. The site owner determines how many times it will allow the site visitor to enter the confirmation number. |
| 11 | When the site visitor presses the pound key, the web page changes and has the following text: "Please listen carefully to the telephone voice prompts (FIG. 10) | Server 38' will instruct the site visitor to record his/her name: "For audit purposes we need to record your name. After the tone, please say your full name, then press pound." | The Server 38' will make a name recording for audit trail information. The owner of site 30' can determine what information should be recorded from the site visitor V. The Server 38' will allow many recordings or no recordings as requested by the site owner. A scripting feature provides such flexibility. The Server 38' has mechanisms that ensure that the recordings are of good quality. The Server 38' is able to detect if a voice is loud enough and long enough to get an accurate recording. The Server 38' can use these recordings by applying voice biometrics to them for subsequent authentications |
| 12 | The same web page as step 11 (FIG. 10) | Server 38' will instruct the site visitor to record his/her acceptance of the terms an conditions: "XYZ Corporation now needs to record your acceptance of the terms and conditions from | Again, this recording is intended to be used as an audit trail mechanism. The owner of site 30' can determine if it would like this voice recording or any additional recordings. |

TABLE III-continued

Immediate Synchronization
Immediate synchronization occurs when the visitor V is using a different communications link for the internet connection than is being used for the automated call from the server 38, FIG. 1 or 38', FIG. 3.

| Step | Internet Session | PSTN Session | Comments |
|---|---|---|---|
| | | its web site. After the tone, please say 'I accept the conditions', then press pound." | The owner of site 30' decides if the Server 38' should use speech recognition to verify proper acceptance or use number entry (e.g. "Press 1 if you accept, 2 if you do not") as an alternative. |
| 13 | The site visitor is redirected back to the site 30' application (FIG. 10) | The Server 38' reads an acknowledgement of success to the site visitor: "Congratulations, you have completed your authentification. Your new userid and password are displayed on your computer screen. Good-bye. | After the site visitor has finished the process prescribed by the owner of site 30', he/she will be redirected back to the owner of site 30' application, thus allowing the owner of site 30' to distribute the ESC. |
| 14 | The site owner will display on its system the next web page in its process. It could potentially give the site visitor: -userid and password -digital certificate -personal identification number -an e-mail to an e-mail box (FIG. 11) | | The site owner will distribute the ESC that the site visitor was initially seeking when he/she came to the SO application in step 1. |

DELAYED SYNCHRONIZATION - TABLE IV

The delayed synchronization scenario occurs when the site visitor V is using the same telephone line for his/her Internet connection as he/she is using to receive the automated telephone call, thus forcing the site visitor to temporarily disconnect from the Internet.

TABLE IV

Delayed Synchronization
The delayed synchronization scenario occurs when the site visitor V is using the same telephone line for his/her Internet connection as he/she is using to receive the automated telephone call, thus forcing the site visitor to temporarily disconnect from the Internet.

| Step | Internet Session | PSTN Session | Comments |
|---|---|---|---|
| 1 | Site visitor arrives at a prescribed web site to initiate the registration process. (FIG. 4) | | |
| 2 | Site visitor enters information into the Site Owner's application as prompted by the web page and submits the information. (FIG. 5) | | Information to be collected will be prescribed by the issuer of the ESC, and could contain identifying information such as name, address, SSN, employee number, account number, mother's maiden name, etc. |
| 3 | SO application uses information submitted by Site visitor to query a data store and determine if the information provided by the site visitor identifies an entity to which an ESC is to be issued by the system. (FIG. 5) | | The Site Visitor information collected can be validated, reviewed for inconsistencies, and associated with an existing identity within the SO's system. |
| 4 | In one embodiment, the SO application displays a list of locations for telephone numbers maintained in the data store for the entity just identified. This list could be | | |

TABLE IV-continued

Delayed Synchronization
The delayed synchronization scenario occurs when the site visitor V is using the same telephone line for his/her Internet connection as he/she is using to receive the automated telephone call, thus forcing the site visitor to temporarily disconnect from the Internet.

| Step | Internet Session | PSTN Session | Comments |
|---|---|---|---|
| | rendered as the location names, the entire telephone number, or a masked number (555-555-***5), and presented back to the Site visitor in a web page. The web page asks the Site visitor to identify at which of the listed locations Site visitor can be reached at this time. There are several other alternates from which the issuer of a credential could choose. These include: • Actual phone numbers may be presented (instead of location names) • The site visitor may be prompted to enter a phone number A combination of location name and last four digits of the number may be used to increase accuracy while maintaining privacy. (FIG. 6) | | |
| 5 | Site visitor identifies the number of the telephone at which he/she can be reached, either by selecting a number or representative location name or by entering the number. This information is then submitted. (FIG. 6) | | IMPORTANT This information is submitted to the system. Therefore, after the site visitor selects a number and clicks submit, he/she is redirected to the Server 38'. The site visitor will be unaware of this because the web pages will look similar to the SO application |
| 6 | Server 38' presents a web page querying the site visitor about his/her ability to answer a call placed to a certain number while connected to the Internet. Example question is "Can you talk on 555-555-***5 while connected to the Internet?" (FIG. 7) | | This question is presented to the Site Visitor in order to determine if the site visitor can receive the automated telephone call while connected to the Internet. Alternately, he/she have to disconnect their computer in order to receive a telephone call. |
| 7 | Server 38' then presents a web page to the site visitor which reconfirms the decision he/she made on the previous page. If the site visitor answered "NO" to the question above then the following text would be displayed. "To personally answer a telephone call placed to 555-555-***5, I must first disconnect my computer from the Internet" (FIG. 12) | | This web page allows the site visitor to confirm that he/she must disconnect the computer from the Internet in order to receive the phone call. It also allows the site visitor to go back to the previous question if the statement that is presented to him/her is incorrect. |
| 8 | Server 38' presents a web page with a confirmation number on it. (FIG. 13) | | The site visitor needs to write down or print out the web page in order to use the confirmation number during the telephone call. |
| 9 | Server 38' presents a web page which contains a URL 'www.finishregistration.com' (FIG. 14) | | The site visitor needs to remember or write down the URL because after the telephone call he/she will need to reconnect to the Internet and direct their web browser to the URL that is shown on the web |

TABLE IV-continued

Delayed Synchronization
The delayed synchronization scenario occurs when the site visitor V is using the same telephone line for his/her Internet connection as he/she is using to receive the automated telephone call, thus forcing the site visitor to temporarily disconnect from the Internet.

| Step | Internet Session | PSTN Session | Comments |
|---|---|---|---|
| | | | page. The reason this is done is because the system must close out the site visitors session before redirecting to the site visitor back to the SO application |
| 10 | Server 38' then presents a web page allowing the site visitor to select how long they want to wait before the call is placed to him/her. (FIG. 15) | | The site visitor will be able to choose the delay time before the telephone call is placed. The SO will instruct as to the values that the Server 38' will display to the site visitor. |
| 11 | Server 38' presents a web page reminding the site visitor about the confirmation number and the URL (web address) (FIG. 16) | | The Server 38' reminds the site visitor one more time of the 2 pieces of information they will need to complete the authentication process. |
| 12 | Server 38' presents a web page instructing the site visitor to disconnect from the Internet and wait for the system to place the automated telephone call (FIG. 17) | | When the site visitor sees this screen the Server 38' will start the timer on the time delay that was chosen in step 10. The SO decides if the Server 38' should use speech recognition to verify proper acceptance or use number entry (e.g. "Press 1 if you accept, 2 if you do not") as an alternative. The web session is now completed, and the phone session will begin |
| 13 | | Voice application begins "Hello, this is XYZ Corporation's automated telephone call. If you are expecting this call, press pound. Otherwise please hang-up." | During the phone call the site visitor is not connected to the web application. This first prompt helps identify that the Server 38' has reached the intended party. |
| 14 | | "Please enter your confirmation number, then press pound" | This step asks the site visitor to enter the number that was previously given to him/her over the web application. This ensures that the person who was on the web session is the same person that is on the telephone |
| 15 | | "For audit purposes we need to record your name. After the tone, please say your full name, then press pound." | This steps takes a voice recording of the site visitor for audit purposes. The Server 38' can use these recordings by applying voice biometrics to them for subsequent authentications. |
| 16 | | "XYZ Corporation now needs to record your acceptance of the terms and conditions from its web site. After the tone, please say 'I accept the conditions', then press pound." | This step takes another voice recording of the site visitor for audit purposes. The Server 38' can use these recordings by applying voice biometrics to them for subsequent authentications. |
| 17 | | "Congratulations, you have completed your telephone authorization. Please go to Internet address www.finishregistration.com to complete your registration. You must reconnect within 20 minutes to complete the process. Good-bye." | This is the last step in the phone session. After the site visitor has completed this step he/she must reconnect his/her computer to the Internet and point their web browser to 'www.finishregistration.com'. This helps reinforce the information that was given to the site visitor in steps 9 and 11. |

TABLE IV-continued

Delayed Synchronization
The delayed synchronization scenario occurs when the site visitor V is using the same telephone line for his/her Internet connection as he/she is using to receive the automated telephone call, thus forcing the site visitor to temporarily disconnect from the Internet.

| Step | Internet Session | PSTN Session | Comments |
|---|---|---|---|
| | | | The Server 38' has the capability of requiring a site visitor to reconnect their computer and go to the appropriate web address within a certain amount of time. The amount of time is configurable as requested by the site owner. |
| 18 | Site visitor V reconnects his/her computer to the Internet and goes for example to: www.finishregistration.com (FIG. 17) | | The Server 38' then checks which site visitor is coming back to the web site and makes all the appropriate checks to ensure he/she has indeed finished the phone session. If all the checks are successful the site visitor is redirected back to the SO application in the exact same manner as the Immediate Synchronization scenario step 13. Thus allowing the SO to distribute the ESC |
| 19 | The site owner will display on their system the next web page in their process. It could potentially give the site visitor: -userid and password -digital certificate -personal identification number -an e-mail to him/her (FIG. 11) | | The site owner will distribute the ESC that the site visitor was initially seeking when they came to the SO application in step 1 |

The following is a list of sample error conditions which may occur and a suggestion of how they may be handled. Handling of many of these conditions is largely a policy issue to be decided by the owner of site 30'. Each of these failure cases has as a possible response that the electronic registration could not be completed.

TABLE V

| | Error Condition | Possible Response |
|---|---|---|
| 1 | Busy signal | • Wait 30 seconds and call back.<br>• Present instructions on the web to choose a different number or clear line. |
| 2 | Telephone call reaches switchboard | • Present recording requesting transfer to Site visitor.<br>• Transfer to human agent on initiation side of the call, request transfer to Site visitor, transfer back to automated attendant.<br>• Play the DTMF tones of the extension the system is trying to reach |
| 4 | Site visitor cancels out of web session | PSTN session thanks them for participating and terminates call. |
| 5 | Site visitor cancels out of PSTN session | Web session presents page offering alternative registration mechanisms. |
| 6 | No voice recording captured | • Provide instructions to speak more loudly.<br>• Fail registration<br>• Accept registration with no voice audit |

An exemplary authorization system in accordance herewith includes, first and second electronic networks which are, at least in part, different. First and second terminals, with each terminal associated with a respective network. Instructions for receiving an inquiry from the first terminal, via the first network. Instructions for establishing an address of the second terminal on the second network. Instructions for establishing a communications link, on the second network, with the second terminal. Instructions for transmitting confirmatory information, via the first network, to the first terminal. Instructions for receiving a representation of the confirmatory information, via the second network, from the second terminal. Instructions for comparing the received representation to the transmitted information and for producing a comparison indicating indicia. Instructions responsive to the comparison indicium for conducting an authorization process and for generating an authorization related indicium; for authorizing a charge to a financial account wherein the inquiry from the first terminal includes a financial account designator, wherein the instructions for conducting an authorization process include instructions for evaluating if a proposed charge to the designated account will be accepted, and, for authorizing a charge to a credit-type account wherein the instructions for evaluating comprise instructions for determining if a proposed charge to a designated credit-type account will be accepted as an increase to an amount due on the respective account.

From the foregoing it will be observed that numerous variations and modifications may be effected without departing from the spirit and scope of the invention. It is to be understood that no limitation with respect to the specific embodiment illustrates herein is intended or should be inferred. The disclosure is intended to cover the appended claims all such modifications as fall within the scope of the claims.

What is claimed:

1. A system comprising:

an electronic, packet switching communications network;

a user operable terminal for coupling a user to a displaced site on the network;

pre-stored, executable instructions for establishing a telephone number for calling the user essentially immediately;

pre-stored instructions for forming confirmation information and for transmitting same to the user terminal for display;

pre-stored instructions for calling the user at the user's phone number via a public telephone network;

pre-stored instructions requesting the user to provide at least the confirmation information during the call; and pre-stored instructions for evaluating the identity of the user.

2. A system as in claim 1 which includes:

executable instructions for creating and storing an audit trail for the transaction.

3. A system in claim 1 which includes executable instructions for providing a verbal request, during the call, that the user provide selected audio information for audit purposes.

4. A system as in claim 1 wherein the establishing instructions include requesting a telephone number from the user for calling the user essentially immediately.

5. A system as in claim 1 wherein the instructions for calling are executed while communicating with the user via the terminal.

6. A system as in claim 1 which includes instructions for transferring the user to evaluating software prior to calling the user.

7. A system as in claim 1 which includes instructions directing the user to sign off of the network prior to executing the instructions for calling the user.

8. A system as in claim 4 wherein the instructions for calling are executed while communicating with the user via the terminal.

9. A system as in claim 1 wherein the establishing instructions retrieve a pre-stored user phone number from storage.

10. A method comprising:

establishing a bi-directional communications link between a visitor and a displaced software driven entity via a first electronic network;

obtaining an identifying indicium for the visitor for a second electronic network;

transferring confirmation information to the visitor, via the first network;

initiating a bi-directional communications link with the visitor via the second network; and transferring the confirmation information received by the visitor to the software driven entity via the second network;

evaluating the received confirmation information at the software driven entity.

11. A method as in claim 10 wherein the first network is selected from a class which includes an internet-type network and an intranet-type network.

12. A method as in claim 10 wherein the obtaining step comprises obtaining a telephone number from the visitor.

13. A method as in claim 10 wherein the transferring step comprises transferring an alphanumeric code as the confirmation information.

14. A method as in claim 10 wherein the transferring step comprises transferring a numeric code as the confirmation information.

15. A method as in claim 10 wherein the initiating step comprises selecting the public switched telephone network as the second network and, placing a telephone call to the visitor.

16. A method as in claim 10 which includes providing directions verbally to the visitor via the bi-directional communications link of the second network.

17. A method as in claim 10 which includes displaying the confirmation information for the visitor.

18. A method as n claim 10 which includes obtaining a pre-stored telephone number for the user.

19. A method as in claim 10 wherein the first electronic network is selected from a class which includes an internet and an intranet.

20. A system comprising:

a first communication path for enabling a user to access at least one of a source of a selected product, a selected service; and a selected functional capability; and a second, different communication path for enabling the use, in response to communications on the first path, to respond to an inquiry initiated by the source using a predetermined station coupled to the second path and associated with the user.

21. A system as in claim 20 wherein the first communication path is established intermittently by the user via a publicly accessible electronic packet switching network.

22. A system as in claim 20 wherein the second communication path is established intermittently by the source via a different, publicly accessible switched network.

23. A system as in claim 21 wherein the second communication path is established intermittently by the source via a different, publicly accessibly voice network.

24. A system as in claim 20 wherein the second communication path is implemented using a publicly available switched telephone network.

25. A system as in claim 20 wherein the station comprises a telephone.

26. A system as in claim 25 wherein the first communication path establishes a link to a site on a digital network associated with the source.

27. A system as in claim 26 wherein the first communication path is established using an Internet service provider.

28. A system as in claim 27 wherein the user provides identifying information to the source using the first path.

29. A system as in claim 25 wherein the source transmits a message to the user to specify an identifier for the station.

30. A system as in claim 29 wherein the source, responding to the identifier, initiates the second communication path using the identifier to specify the station.

31. A system as in claim 30 wherein the source initiates a call to the telephone.

32. A system as in claim 31 wherein the user uses the telephone, in response to the source to provide selected information to the source via the second communication path.

33. A system as in claim 32 wherein the selected information is processed by the source to provide at least one of an authentication function, an authorization function and a collection function associated with the user.

34. A system as in claim 33 wherein the source, in response to selected results of processing the selected information executes one of an authentication function and an authorization function.

35. A system as in claim 34 wherein the source transmits a first, graphically displayable indicium to the user via the first communication path and wherein the user, via the telephone transmits a second indicium to the source, wherein the source processes the received indicium and in response thereto executes one of the functions provided that the received indicium exhibits a predetermined characteristic.

36. A system as in claim 35 wherein the first indicium and the second indicium contain the same information.

37. A system as in claim 20 wherein an audit trail is created by the source.

38. A system as in claim 34 wherein an audit trail is created by the source along with executing the function.

39. A system as in claim 25 wherein a call is automatically placed to the telephone on behalf of the source and responses from the telephone are analyzed on behalf of the source.

40. A system as in claim 39 wherein audit information is collected during the call.

41. A system as in claim 39 wherein the source provides a communication function, and where the responses from the telephone exhibit a predetermined characteristic, the user will be provided access to the communication function.

42. A system comprising:

first and second electronic networks which are, at least in part; different;

first and second terminals, physically adjacent to one another, with each terminal associated with a respective network;

pre-stored, executable instructions for receiving an inquiry from the first terminal, via the first network;

additional executable instructions for establishing an address of the second terminal on the second network;

instructions for establishing a communications link, on the second network, with the second terminal;

instructions for transmitting confirmatory information, via the first network, to the first terminal;

instructions for receiving a representation of the confirmatory information, via the second network, from the second terminal; and instructions for comparing the received representation to the transmitted information.

43. A system as in claim 42 wherein the second network comprises a switched telephone system.

44. A system as in claim 43 wherein the second terminal comprises a telephone handset.

45. A system as in claim 43 wherein the communications link of the second network is established simultaneously with another communications link using the first network.

46. A system as in claim 43 which includes instructions for displaying the confirmatory information on the first terminal.

47. An authorization system comprising:

first and second electronic networks which are, at least in part, different;

first and second terminals, with each terminal associated with a respective network;

instructions for receiving an inquiry from the first terminal, via the first network;

instructions for establishing an address of the second terminal on the second network;

instructions for establishing a communications link, on the second network, with the second terminal;

instructions for transmitting confirmatory information, via the first network, to the first terminal;

instructions for receiving a representation of the confirmatory information, via the second network, from the second terminal;

instructions for comparing the received representation to the transmitted information and for producing a comparison indicating indicium; and instructions, responsive to the comparison indicium, for conducting an authorization process and for generating an authorization related indicium.

48. A system as in claim 47 wherein the second network comprises a switched telephone system with a wireless portion.

49. A system as in claim 48 wherein the second terminal comprises one of a land line telephone and a wireless phone.

50. A system as in claim 48 wherein the communications link of the second network is established simultaneously with another communications link using the first network.

51. A system as in claim 48 which includes instructions for displaying the confirmatory information on the first terminal.

52. A system as in claim 47 for authorizing a charge to a financial account wherein the inquiry from the first terminal includes a financial account designator.

53. A system as in claim 52 wherein the instructions for conducting an authorization process comprise instructions for evaluating if a proposed charge to the designated account will be accepted.

54. A system as in claim 53 for authorizing a charge to a credit-type account wherein the instructions for evaluating comprise instructions for determining if a proposed charge to a designated credit-type account will be accepted as an increase to an amount due on the respective account.

55. An authentication process comprising:

establishing a first communications channel via a computer network between an individual at a location and a provider of at least one of a product or service;

transmitting at least an authentication indicium from the provider to the individual, using the first communications channel;

retrieving an address of the individual for establishing a second communications channel via a different network;

initiating communications, via the different network, with the individual at the address;

returning the indicium, via the different network, for comparison to the transmitted indicium, and, where substantially indentical, providing an authenticated indicium to the provider.

56. A process as in claim 55 where the computer network includes at least one of an intranet or an internet.

57. A process as in claim 55 where the different network includes at least a portion of a public telephone network.

58. A process as in claim 55 where the address comprises a multi-digit telephone number.

59. A process as in claim 57 where the indicium is returned by the individual via at least the portion of the telephone network.

* * * * *